US008832704B2

(12) United States Patent
Takemura et al.

(10) Patent No.: US 8,832,704 B2
(45) Date of Patent: Sep. 9, 2014

(54) IN-CAR-USE MULTI-APPLICATION EXECUTION DEVICE

(75) Inventors: Masayuki Takemura, Hitachi (JP); Shoji Muramatsu, Hitachinaka (JP); Isao Furusawa, Hitachinaka (JP); Shinya Ohtsuji, Tokai (JP); Takeshi Shima, Mito (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 199 days.

(21) Appl. No.: 13/504,418

(22) PCT Filed: Aug. 12, 2010

(86) PCT No.: PCT/JP2010/063692
§ 371 (c)(1),
(2), (4) Date: Apr. 26, 2012

(87) PCT Pub. No.: WO2011/055581
PCT Pub. Date: May 12, 2011

(65) Prior Publication Data
US 2012/0216208 A1 Aug. 23, 2012

(30) Foreign Application Priority Data
Nov. 6, 2009 (JP) ................. 2009-255106

(51) Int. Cl.
*G06F 9/46* (2006.01)
(52) U.S. Cl.
USPC ...................................................... 718/103
(58) Field of Classification Search
CPC ....................................................... G06F 9/461
USPC .......................................................... 718/103
See application file for complete search history.

(56) References Cited

U.S. PATENT DOCUMENTS

| 5,938,708 | A | 8/1999 | Wallace et al. | |
|---|---|---|---|---|
| 2001/0020211 | A1* | 9/2001 | Takayama et al. | 701/200 |
| 2006/0101465 | A1 | 5/2006 | Kato et al. | |
| 2006/0218559 | A1* | 9/2006 | Ahmed et al. | 718/108 |

(Continued)

FOREIGN PATENT DOCUMENTS

| JP | 10-133890 A | 5/1998 |
|---|---|---|
| JP | 2006-90356 A | 4/2006 |

(Continued)

OTHER PUBLICATIONS

WO2008062512, May 29, 2008.*

(Continued)

*Primary Examiner* — Emerson Puente
*Assistant Examiner* — Charlie Sun
(74) *Attorney, Agent, or Firm* — Crowell & Moring LLP

(57) ABSTRACT

An in-car-use multi-application execution device is provided that ensures safety while maintaining convenience by securing operation of a plurality of applications and suppressing occurrence of a termination process within a limited processing capacity without degrading a real-time feature. The in-car-use multi-application execution device dynamically predicts a processing time for each application, and schedules each application on the basis of the predicted processing time. If it is determined that an application failing to complete a process in a prescribed cycle exists as a result of the scheduling, a process is executed that terminates the application or degrades the function of the application on the basis of a preset priority order.

11 Claims, 25 Drawing Sheets

(56) References Cited

U.S. PATENT DOCUMENTS

| | | | |
|---|---|---|---|
| 2007/0106987 A1 | 5/2007 | Makino | |
| 2007/0220523 A1* | 9/2007 | LaFruit et al. | 718/104 |
| 2009/0089795 A1 | 4/2009 | Yoshida et al. | |
| 2009/0198389 A1* | 8/2009 | Kirchhof-Falter et al. | 701/1 |
| 2010/0058086 A1* | 3/2010 | Lee | 713/322 |
| 2010/0073503 A1* | 3/2010 | Tanaka et al. | 348/222.1 |
| 2010/0169892 A1* | 7/2010 | Stam et al. | 718/105 |
| 2011/0209153 A1* | 8/2011 | Suzuki et al. | 718/102 |

FOREIGN PATENT DOCUMENTS

| | | |
|---|---|---|
| JP | 2006-134203 A | 5/2006 |
| JP | 2007-133696 A | 5/2007 |
| JP | 2009-86733 A | 4/2009 |
| WO | WO 2008/062512 A1 | 5/2008 |
| WO | WO 2008/139328 A2 | 11/2008 |

OTHER PUBLICATIONS

English Translation of WO2008062512, May 29, 2008.*
European Search Report dated Apr. 3, 2013 (Three (3) pages).
International Search Report with English translation dated Sep. 7, 2010 (four (4) sheets).
Form PCT/ISA/237 (four (4) sheets), Sep. 7, 2010.
Muramatsu et al., "Image Recognition Technology for Automotive Applications and its Platform Development", Hitachi Hyoron, Aug. 1, 2007, vol. 89, No. 8, pp. 56-59 with partial English translation (seven (7) sheets).
Muramatsu et al., "Automotive Vision Platform and Its Applications", The Institute of Electrical Engineers of Japan Kenkyukai Shiryo, Jan. 27, 2006, pp. 39-44 (seven (7) sheets).
Iiyama et al., "A Schedulability Analyzing Method for Engine Management System", Computer System Symposium Ronbunshu, Nov. 19, 2001, vol. 2001, No. 16, pp. 97-104 (ten (10) sheets).

* cited by examiner

Fig. 7

| Application (function) name | Validity flag | Priority order | Allocation core (CPU) | Processing [fps] | Resolution [lateral, vertical] | Detection distance | Initial processing time [msec] | Predicted processing time [msec] |
|---|---|---|---|---|---|---|---|---|
| Lane recognition (necessary) | ON | 7 | 1 | 1/1 | [1/3,1/2] | 40 | 33 | 28 |
| Pedestrian detection (necessary) | ON | 5 | 1 | 1/1 | [1/3,1/2] | 40 | 33 | 6 |
| Car detection (necessary) | ON | 6 | 1 | 1/1 | [1/3,1/2] | 40 | 33 | 10 |
| Lane recognition (additional) | ON | 11 | 1 | 1/1 | [1,1] | 60 | 20 | 10 |
| Pedestrian detection (additional) | ON | 12 | 1 | 1/1 | [1,1] | 80 | 33 | 25 |
| Car detection (additional) | ON | 13 | 1 | 1/1 | [1,1] | 80 | 33 | 20 |
| Auto light | ON | 25 | 1 | 1/3 | [1/3,1/2] | 15 | 10 | 5 |
| Sign detection | ON | 31 | 1 | 1/3 | [1/3,1/2] | 25 | 20 | 14 |
| Road sign detection | ON | 32 | 1 | 1/3 | [1/3,1/2] | 15 | 5 | 5 |

Fig. 8

| Application (function) name | Validity flag | Priority order | Allocation core (CPU) | Processing [fps] | Resolution [lateral, vertical] | Detection distance | Initial processing time [msec] | Predicted processing time [msec] |
|---|---|---|---|---|---|---|---|---|
| Lane recognition (necessary) | ON | 7 | 1 | 1/1 | [1/3, 1/2] | 40 | 33 | 30 |
| Pedestrian detection (necessary) | OFF | - | - | - | - | - | - | - |
| Car detection (necessary) | ON | 6 | 1 | 1/1 | [1/3, 1/2] | 50 | 40 | 15 |
| Lane recognition (additional) | ON | 13 | 1 | 1/1 | [1, 1] | 80 | 18 | 15 |
| Pedestrian detection (additional) | OFF | - | - | - | - | - | - | - |
| Car detection (additional) | ON | 12 | 1 | 1/1 | [1, 1] | 100 | 33 | 30 |
| Auto light | ON | 25 | 1 | 1/5 | [1/3, 1/2] | 15 | 10 | 4 |
| Sign detection | ON | 31 | 1 | 1/3 | [1/3, 1/2] | 25 | 20 | 10 |
| Road sign detection | OFF | - | - | - | - | - | - | - |

Fig. 13
(a)
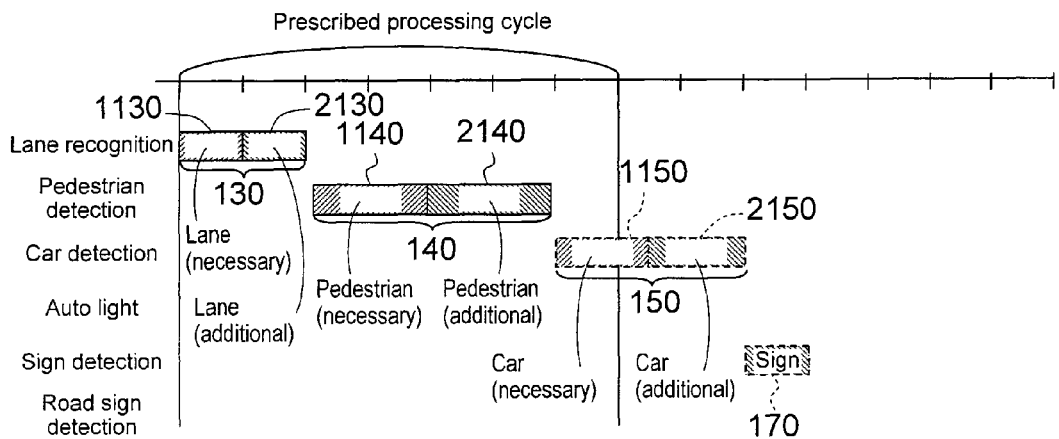
(b)
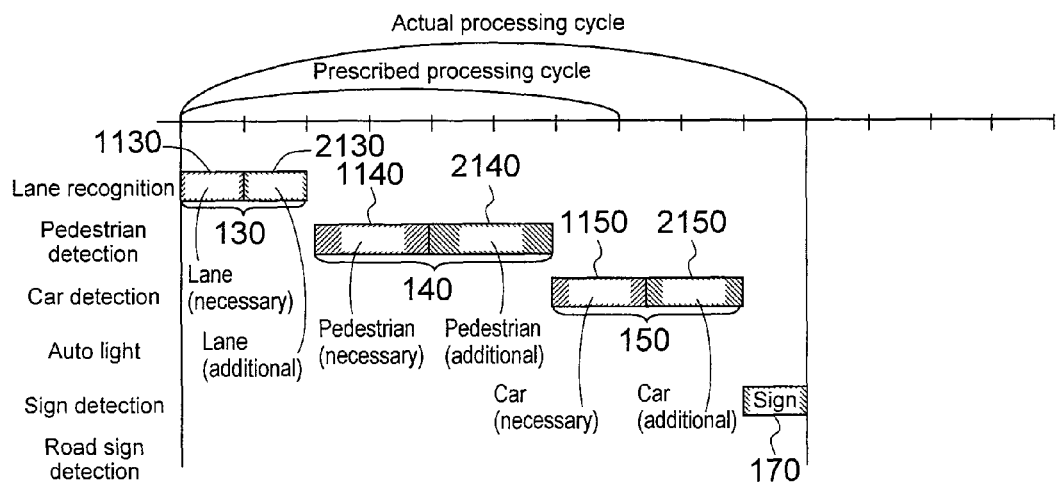

Fig. 14
(a)
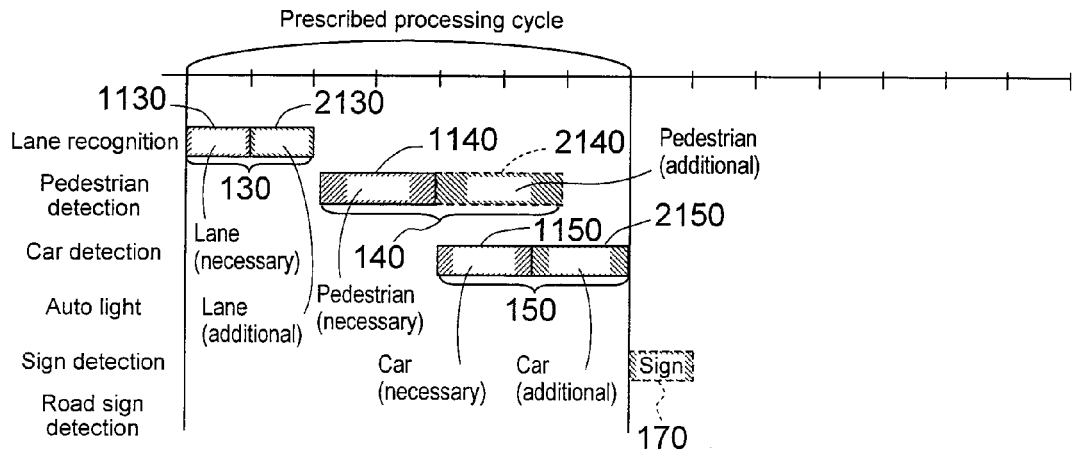
(b)
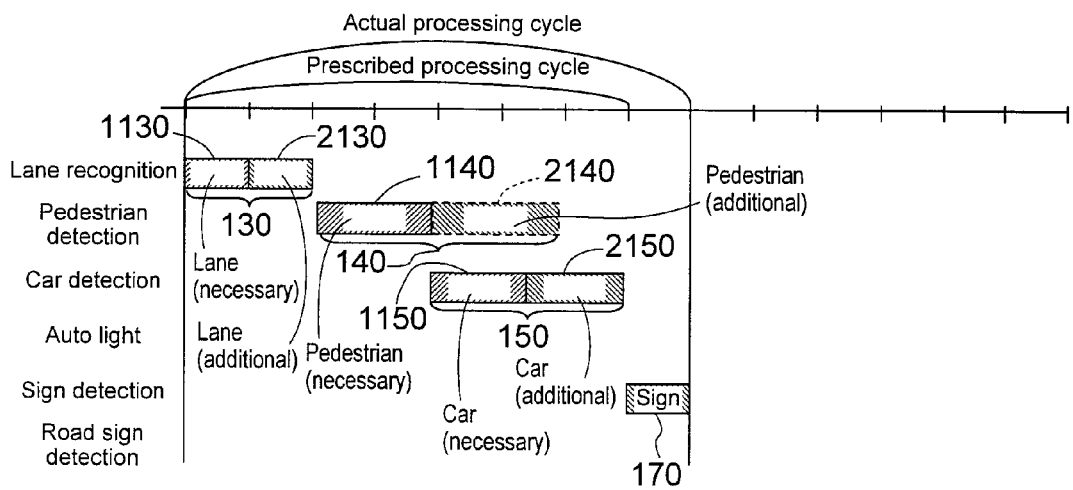

Fig. 28

| Application (function) name | Validity flag | Priority order | Allocation core (CPU) | Processing [fps] | Resolution [lateral, vertical] | Detection distance | Initial processing time [msec] | Predicted processing time [msec] |
|---|---|---|---|---|---|---|---|---|
| Lane recognition (necessary) | ON | 7 | 1 | 1/1 | [1/3,1/2] | 40 | 33 | 20 |
| Pedestrian detection (necessary) | ON | 5 | 2 | 1/1 | [1/3,1/2] | 40 | 33 | 10 |
| Car detection (necessary) | ON | 6 | 1 | 1/1 | [1/3,1/2] | 40 | 33 | 83 |
| Lane recognition (additional) | ON | 11 | 1 | 1/1 | [1,1] | 60 | 20 | 31 |
| Pedestrian detection (additional) | ON | 12 | 2 | 1/1 | [1,1] | 80 | 33 | 3 |
| Car detection (additional) | ON | 13 | 1 | 1/1 | [1,1] | 80 | 33 | 66 |
| Auto light | ON | 25 | 2 | 1/5 | [1/3,1/2] | 15 | 10 | 3 |
| Sign detection | ON | 31 | 2 | 1/3 | [1/3,1/2] | 25 | 20 | 19 |
| Road sign detection | ON | 32 | 1 | 1/3 | [1/3,1/2] | 15 | 5 | 5 |

Fig. 29

| Application (function) name | Validity flag | Priority order | Allocation core (CPU) | Processing [fps] | Resolution [lateral, vertical] | Detection distance | Initial processing time [msec] | Predicted processing time [msec] |
|---|---|---|---|---|---|---|---|---|
| Lane recognition (necessary) | ON | 7 | 1 | 1/1 | [1/3,1/2] | 40 | 33 | 20 |
| Pedestrian detection (necessary) | ON | 5 | 2 | 1/1 | [1/3,1/2] | 40 | 33 | 10 |
| Car detection (necessary) | ON | 6 | 1 | 1/1 | [1/3,1/2] | 40 | 33 | 83 |
| Lane recognition (additional) | OFF | - | - | - | - | - | 20 | 31 |
| Pedestrian detection (additional) | ON | 12 | 2 | 1/1 | [1,1] | 80 | 33 | 3 |
| Car detection (additional) | ON | 13 | 2 | 1/1 | [1,1] | 80 | 33 | 66 |
| Auto light | ON | 25 | 2 | 1/5 | [1/3,1/2] | 15 | 10 | 3 |
| Sign detection | OFF | - | - | - | - | - | 20 | 19 |
| Road sign detection | ON | 32 | 2 | 1/3 | [1/3,1/2] | 15 | 5 | 5 |

Fig. 30

| Application (function) name | Validity flag | Priority order | Allocation core (CPU) | Processing [fps] | Resolution [lateral, vertical] | Detection distance | Initial processing time [msec] | Predicted processing time [msec] |
|---|---|---|---|---|---|---|---|---|
| Lane recognition (necessary) | ON | 7 | 1 | 1/1 | [1/3,1/2] | 40 | 33 | 20 |
| Pedestrian detection (necessary) | ON | 5 | 2 | 1/1 | [1/3,1/2] | 40 | 33 | 10 |
| Car detection (necessary) | ON | 6 | 1 | 1/1 | [1/3,1/2] | 40 | 33 | 83 |
| Lane recognition (additional) | ON | 11 | 2 | 1/1 | [1,1] | 60 | 20 | 31 |
| Pedestrian detection (additional) | ON | 12 | 2 | 1/1 | [1,1] | 80 | 33 | 3 |
| Car detection (additional) | ON | 13 | 2 | 1/1 | [1,1] | 80 | 33 | 66 |
| Auto light | OFF | - | - | - | - | - | 10 | 3 |
| Sign detection | OFF | - | - | - | - | - | 20 | 19 |
| Road sign detection | OFF | - | - | - | - | - | 5 | 5 |

IN-CAR-USE MULTI-APPLICATION EXECUTION DEVICE

TECHNICAL FIELD

The present invention relates to an in-car-use multi-application execution device that executes applications in an in-car-use device, for instance, an in-car-use camera and the like.

BACKGROUND ART

In a device that processes information used for car traveling, appropriate processing of information is important for improving safety of car traveling. There have recently been needs to improve safety of car traveling, which increases an amount of information processed in an information processing device. Processing at any time all information on safety of car traveling increases a load on the information processing device, which causes a problem in response speed. For this reason, a proposed technique prevents termination of processing while securing a prescribed cycle when it is determined that the processing may not be completed in a prescribed cycle by allocating CPU time to an application program that may not complete the processing in the present cycle so as not to exceed a CPU available time in the next cycle (e.g. Patent Document 1).

Patent Document 1: JP Patent Publication (Kokai) No. 2009-86733A (2009)

DISCLOSURE OF THE INVENTION

Problems to be Solved by the Invention

Unfortunately, in an application of image recognition in an in-car-use camera for instance, it would be highly likely that no time would be available in the next cycle due to a high load if a process in the present cycle could not be completed. Accordingly, in the application of image recognition, an effect of suppressing termination of processing would be insufficient only by using available time in the next cycle. It can be considered that scheduling of multi-applications according to traveling situations with a limited CPU processing capacity is important.

The present invention is made in view of the above considerations. It is an object of the present invention to provide an in-car-use multi-application execution device that secures operation of multi-applications with a limited processing capacity without degrading a real-time feature and suppresses occurrence of a termination process to thereby ensure safety while maintaining convenience.

Means for Solving the Problems

An in-car-use multi-application execution device of the present invention solving the problems is an in-car-use multi-application execution device executing a plurality of applications in a prescribed cycle, wherein the device dynamically predicts a processing time for each application and schedules each application on the basis of the predicted processing time.

Advantages of the Invention

The in-car-use multi-application execution device of the present invention dynamically predicts the processing time of each application, and schedules each application on the basis of the predicted processing time. Accordingly, operation of the application programs can be secured with a limited processing capacity and without degrading the real-time feature, and occurrence of a termination process is suppressed to thereby secure safety while maintaining convenience.

The contents described in the description and/or drawings of Japanese Patent Application No. 2009-255106, on the basis of which this application claims the priority right, is incorporated by reference in this description.

BRIEF DESCRIPTION OF THE DRAWINGS

FIG. 7 is a diagram showing an example of a task table for an ordinary road mode (in an ordinary case);

FIG. 8 is a diagram showing an example of a task table for an expressway mode (in the ordinary case);

FIG. 13 is a diagram illustrating a problem of conventional scheduling;

FIG. 14 is a diagram illustrating an example of scheduling in accordance with the embodiment;

FIG. 28 is a diagram showing an example of a task table (two cores (CPU) in the ordinary case) for the ordinary road mode;

FIG. 29 is a diagram showing an example of a task table (change of allocation of the two cores (CPU) (in the case of car detection postponement)) for the ordinary road mode; and FIG. 30 is a diagram showing an example of a task table for the ordinary road mode (parallel processing in the two cores (CPU) in the case of car detection postponement).

DESCRIPTION OF SYMBOLS

100 . . . in-car-use multi-application execution device, 101 . . . camera imager, 111 . . . dynamic processing time prediction unit, 121 . . . multi-application controller (scheduler), 125 . . . multi-application execution unit, 130 . . . lane recognition application, 1130 . . . necessary application, 2130 . . . additional application, 140 . . . pedestrian detection application, 1140 . . . necessary application, 2140 . . . additional application, 150 . . . car detection application, 1150 . . . necessary application, 2150 . . . additional application, 160 . . . auto light application, 170 . . . sign detection application, 180 . . . road sign detection application, 1100 . . . necessary function section, 2100 . . . additional function section, 201 . . . own car travel information unit, 213 . . . direction indicator, 214 . . . application operation, 215 . . . navigation system, 216 . . . radar, 250 . . . car controller, 260 . . . car ECU, 261 . . . car velocity sensor, 262 . . . steering angle sensor, 263 . . . yaw rate sensor, 264 . . . actuator, 300 . . . control and warning determination unit

BEST MODE FOR CARRYING OUT THE INVENTION

<System Configuration>

Figure 1:
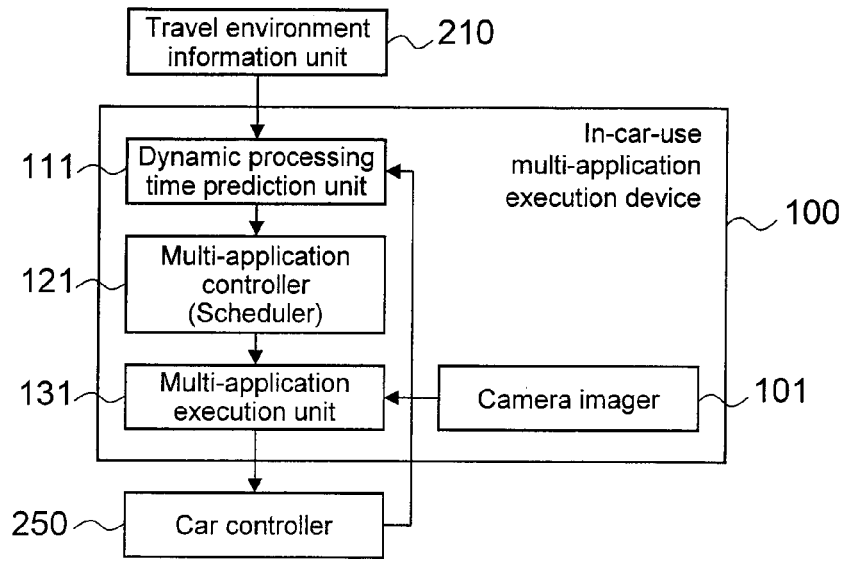
FIG. 1 is a block diagram of an in-car-use multi-application execution device of this embodiment.

FIG. 1 is a functional block diagram of an in-car-use multi-application execution device of this embodiment.

The in-car-use multi-application execution device 100 executes in-car-use application programs (hereinafter simply referred to as applications) for recognition for improving safety or convenience, in real time within a prescribed cycle. In this embodiment, the device is integrally configured in an in-car-use camera device.

As shown in the function-specific configuration block diagram of FIG. 1, the in-car-use multi-application execution device 100 includes a camera imager 101, a dynamic processing time prediction unit 111, a multi-application controller (scheduler) 121 and a multi-application execution unit 131.

The camera imager 101 takes images around or in the own car. The dynamic processing time prediction unit 111 predicts processing times for the respective applications in each prescribed cycle. The in-car-use multi-application execution device 100, which is required to respond in real time, executes the applications in a preset time. The preset time is determined as a prescribed cycle.

The multi-application controller 121 appropriately schedules each application in terms of safety and convenience using the predicted processing time dynamically predicted by the dynamic processing time prediction unit 111. The scheduling determines whether each application is executed or not, and the order of execution of the applications.

The multi-application execution unit 131 executes the applications on the basis of a scheduling result of the multi-application controller 121. The result output from the multi-application execution unit 131 is communicated to a car controller 250 via a CAN (controller area network), and used for control, alarm, warning, display and the like pertaining to car safety.

The car controller 250 grasps traveling situations of the own car, and communicates with the travel environment information unit 210 via the CAN to acquire information on the travel environment of the own car. The dynamic processing time prediction unit 111 predicts the processing time for each application in the next cycle, from the information of the car controller 250, the information of the travel environment information unit 210 and the information of the multi-application execution unit 131.

Figure 2:
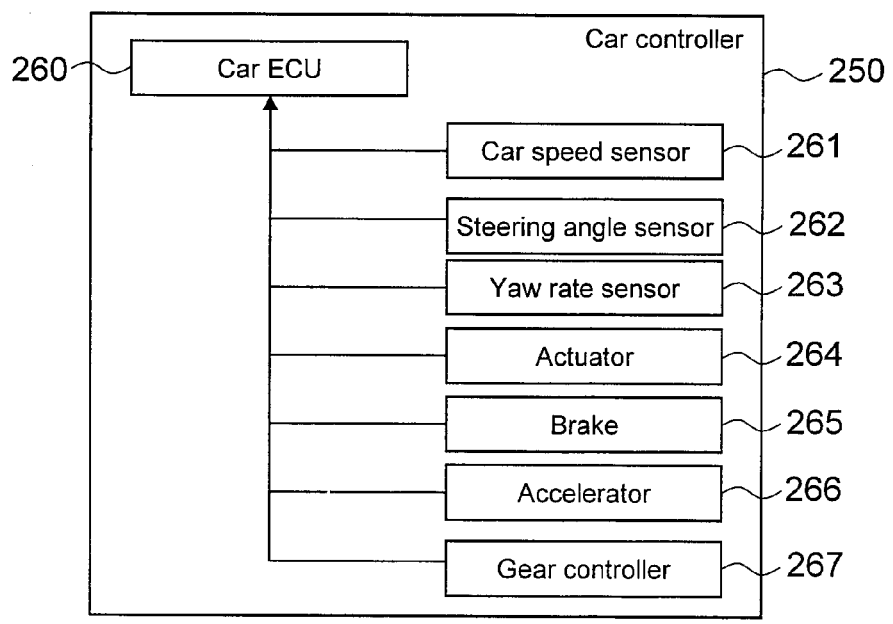
FIG. 2 is a block diagram of a car controller.

FIG. 2 shows a configuration of the car controller 250. The car controller 250 includes a car velocity sensor 261, a steering angle sensor 262, a yaw rate sensor 263, an actuator 264, a brake 265, an accelerator 266 and a gear controller 267, as shown in FIG. 2, and controls travel situations of the car. The car controller 250 controls the car mainly on a car ECU 260. The car ECU 260 controls the brake 265, the actuator 264, the accelerator 266 and the gear controller 267, and manages information on the present situations by communication with the car velocity sensor 261, the steering angle sensor 262 and the yaw rate sensor 263. The car controller 250 also determines execution of control, warning, alarm and display for safety, according to a result of the multi-application execution unit 131.

Figure 3:
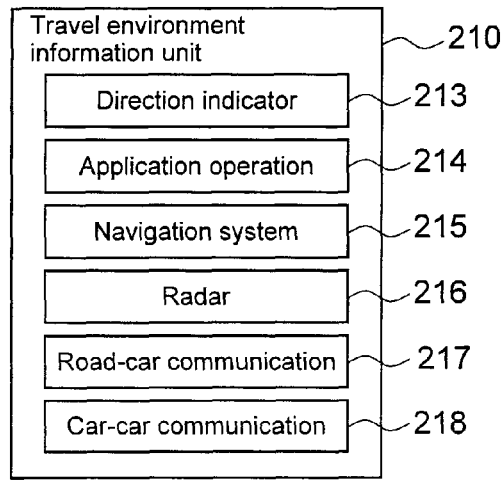
FIG. 3 is a block diagram of a travel environment information unit.
Figure 6:
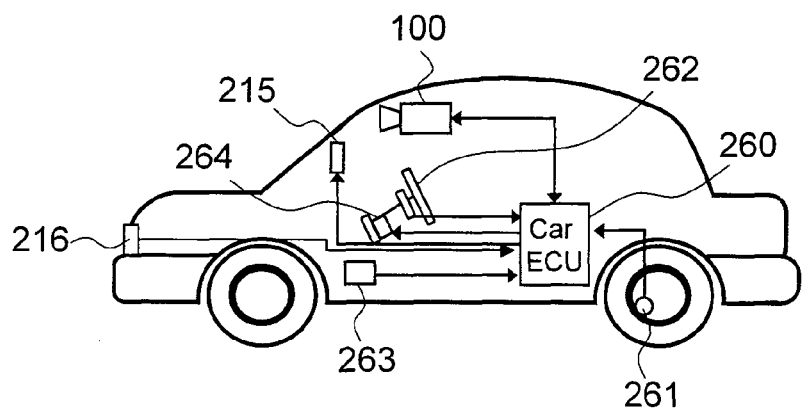
FIG. 6 is an arrangement diagram of the in-car-use multi-application execution device.

As shown in FIG. 3, the travel environment information unit 210 acquires information that is not directly related to travel of the car and indicates situations of travel environment around the car, from the direction indicator 213, the application operation 214, the navigation system 215, the radar 216, the road-car communication 217, the car-car communication 218 and the like. The dynamic processing time prediction unit 111 of the in-car-use multi-application execution device 100 predicts a dynamic processing time using a result of the travel environment information unit 210. FIG. 6 is a diagram schematically showing an example of arrangement in which the in-car-use multi-application execution device 100 is mounted on the car.

Figure 4:
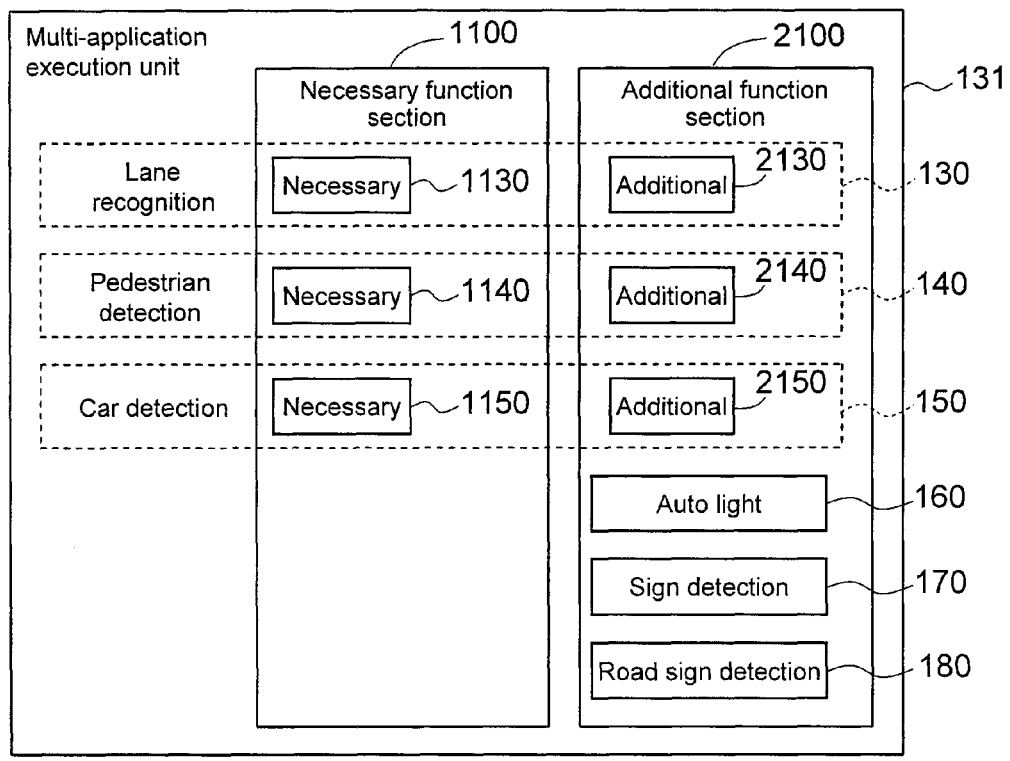
FIG. 4 is a block diagram of a multi-application execution unit.

FIG. 4 is a block diagram showing a detailed structure of the multi-application execution unit 131. All image processing applications are registered on a function-by-function basis in the multi-application execution unit 131, which has a structure classified into two sections, or a necessary function section 1100 and an additional function section 2100. As shown in FIG. 4, the function of the multi-application execution unit 131 is classified into the necessary function section 1100 having a direct advantageous effect for preventing an accident, and the additional function section 2100 whose main object is to support comfortable driving.

Even in the case where the processing load of the multi-application is high and the processing does not complete in the prescribed cycle, safety is ensured by registering applications whose operation is desired to be secured for ensuring safety in the necessary function section 1100. For instance, in the case where an unexpectedly large number of pedestrian candidates, car candidates and the like come into sight of the camera imager 101, the processing time for each application significantly increases. In such a case where the processing may not be completed within the prescribed cycle, it is intended to allow termination of the processing for securing the prescribed cycle or extension of the prescribed cycle.

The types of applications are thus classified into the safety function, which allows extension of the prescribed cycle because termination of an incomplete process in the prescribed cycle is considered to impair safety, and the additional function, for which rigid adherence to the prescribed cycle by terminating the processing is more important to ensure safety than extension of the prescribed cycle. This classification improves convenience of ordinary cases while maintaining safety.

When a process is terminated for securing the prescribed cycle, the result cannot be acquired until the next cycle and the termination may occur again on the same application in the next cycle. Adherence only to the prescribed cycle for ensuring the real-time feature causes contradiction in terms of safety. It is more desirable to make scheduling so as not to cause termination of a process in the first place, and it is more important to have more available time of the CPU that can be allocated to safety applications in time of a high processing load.

In order to pursues convenience, applications that are not necessarily operated in time of a high processing load but provide useful information for a driver in ordinary travel are registered in the additional function section 2100. The additional function for convenience can be used as an available time margin of the CPU for securing operation of the safety applications. In the ordinary case, the convenience is effectively utilized.

As shown in FIG. 4, in this embodiment, a lane recognition application 130, a pedestrian detection application 140 and a car detection application 150 are registered in a manner classified into the necessary function section 1100 and the additional function section 2100. This registration enables a safety-oriented design and convenience to be compatible with each other. The auto light application 160, the sign detection application 170 and the road sign detection application 180 are registered only in the additional function section 2100.

The lane recognition application 130 has an image processing function that recognizes a white line WL on a road from an image taken by the camera imager 101. In the lane recognition application 130, a necessary application 1130 capable of estimating the lateral position and the yaw angle of the own car in a lane, from which direct advantageous effects for protection and safety are expected, is classified into the necessary function section 1100. Situations of white line WL more distant than a curve are regarded as a detection target. The additional application 2130, from which advantageous effects are expected for comfortable driving, such as deceleration before entry into a curve and steering support at the curve, is classified into the additional function section 2100.

In the lane recognition application 130, the recognition function for preventing deviation from a lane that is directly related to safety is classified as the necessary application 1130 into the necessary function section 110; the recognition function for deceleration before entry into a curve that is related to convenience is classified as the additional application 2130 into the additional function section 2100. In the case where the processing of the application with a high processing load is not completed within the assumed processing time, the application related to convenience is terminated or executed with a degraded performance. This secures the prescribed cycle and suppresses termination of the process related to safety, thereby realizing higher safety.

The pedestrian detection application 140 is also classified into a necessary application 1140, which secures operation with respect to the distance capable of collision avoidance in consideration of a braking distance according to the car velocity, and an additional application 2140, which executes a detection process also for a more distant pedestrian candidate. The necessary application 1140 for ensuring safety assumes that a pedestrian is at a distance close to a certain extent and thereby uses an image with a certain resolution instead of an image with a high resolution and adopts a setting adheres to increase in the update cycle of the detection result. The additional application 2140 of the pedestrian detection application 140 uses an image with a high resolution to consider a more distant pedestrian.

The car detection application 150 is also classified into a necessary application 1150, which executes image processing on a car candidate that is necessary to avoid collision in consideration of the relative velocity and distance to the preceding car and the steering angle of the own car, and an additional application 2150, which regards a more distant car as a detection target for the sake of earlier detection of a car, improvement in detection rate, and control of distance between cars. The objects pertaining to the resolution and the processing cycle are analogous to those of the pedestrian detection application 140.

In the pedestrian detection application 140 and the car detection application 150, the recognition processes for collision avoidance are classified into the necessary applications 1140 and 1150, and the recognition of distant places that is not directly used for car control is classified into additional applications 2140 and 2150. This classification realizes function-specific processing cycle control and turning on and off of functions. Each application is thus classified into the necessary function section 1100 and the additional function section 2100 according to the function. Such classification can reduce the processing load by terminating the processing of the function of the additional application or degrading the accuracy in the case where the process is unlikely to be completed in the prescribed cycle, thereby allowing the process to be completed within the prescribed cycle. Accordingly, the real-time feature is secured, safety is further improved, and convenience in ordinary cases is ensured.

The auto light application 160 detects the brightness of the outside by executing image recognition of an image taken by the camera imager 101, and controls turning on and off and the directions of headlights. This detection, concurrently used with detection of a preceding car, controls switching of high and low beams. This detection is concurrently used with the predicted direction of the own car from the lane recognition application 130 or the car velocity sensor 261 and the steering angle sensor 262 of the car controller 250, or the predicted direction of the own car from the navigation system 215. This concurrent use controls the lighting angles of the head lights in the curve direction. Further, concurrent use of the road sign detection 180 is utilized for controlling the lighting angles at an intersection. The auto light application 160 has an object to support more comfortable driving. This application is entirely classified into the additional function section 2100.

The sign detection application 170 has an object to support comfortable driving by detecting a road sign, such as on a speed limit, and providing the information for the driver. Accordingly, this application is entirely classified into the additional function section 2100.

The road sign detection application 180 has a function of detecting information for supporting driving by the driver, such as accurate navigation position information, by detecting a speed limit sign on a road and a pedestrian crossing. Accordingly, this application is entirely classified into the additional function section 2100.

Figure 5:
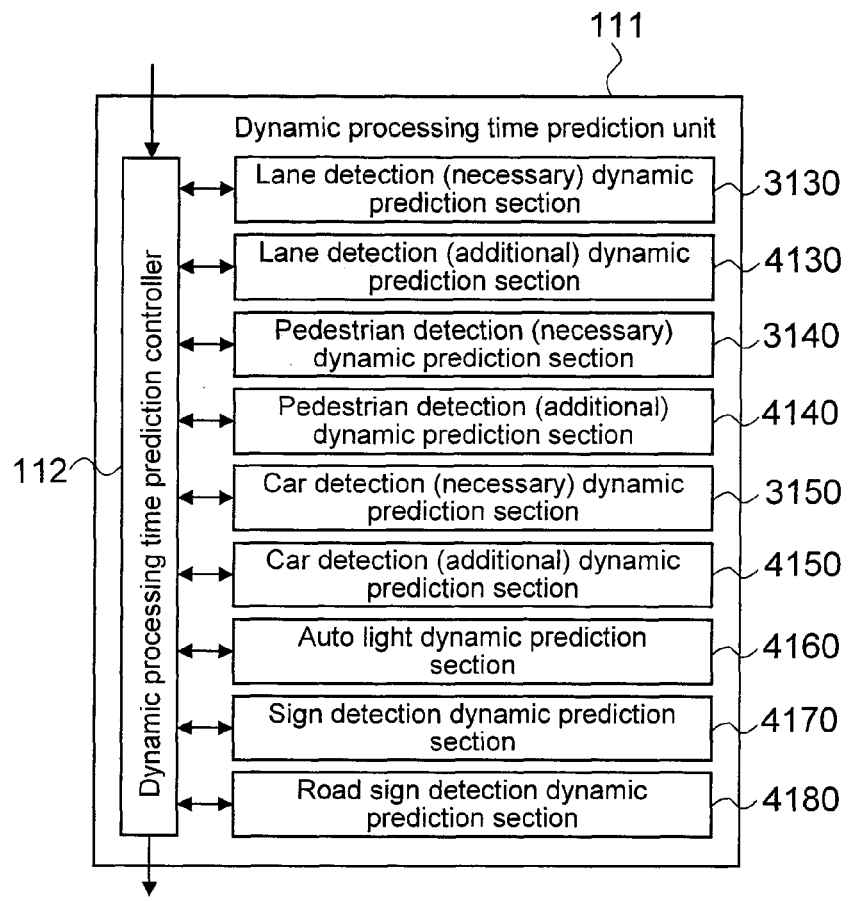
FIG. 5 is a block diagram of a dynamic processing time prediction unit.

FIG. 5 shows a block diagram of the dynamic processing time prediction unit. The dynamic processing time prediction unit 111 selects information to be used by a dynamic processing time prediction controller 112 for prediction in a manner specific to each application, from the travel environment information unit 210, the multi-application execution unit 131 and the car controller 250, and transmits the selected information to the dynamic prediction sections 3130 to 3150 and 4130 to 4180 of the respective functions. The dynamic prediction sections 3130 to 3150 and 4130 to 4180 of the respective functions predict the processing time in the next frame on the basis of the information acquired from the dynamic processing time prediction controller 112.

<Task Table>

The multi-application controller 121 execute basic scheduling on the basis of a task table, and corrects the details of the schedule using the predicted processing time predicted by the dynamic processing time prediction unit 111. Responsive operation to a termination process and addition of the convenience function in time of a low load are corrected using the predicted processing time.

FIG. 7 shows a task table used during traveling on an ordinary road. FIG. 8 shows a task table used during traveling on an expressway. As shown in FIGS. 7 and 8, the task tables classify the applications, and arrange the applications along the ordinate and arrange setting items along the abscissa. Each application is controlled in a manner specific to the setting items. The details of each item set in the task table will hereinafter be described.

A validity flag is a flag for determining whether or not to operate the application in a mode selected from an ordinary road mode for traveling on an ordinary road and an express mode for traveling on an expressway, that is, whether to execute the application or not. An on state indicates operation and an off state indicates stop.

The lane recognition application 130, the pedestrian detection application 140 and the car detection application 150 are applications including a necessary function section 1100 and an additional function section 2100. When the validity flag of the necessary function section 1100 is off, the validity flag of the additional function section 2100 of the same application is necessarily set to be off.

For instance, in a state where the operation of the necessary application 1130 of the lane recognition application 130 is stopped with the validity flag being OFF, there is no case in which only the validity flag of the additional application 2130 of the lane recognition 130 is on and the application operates. In the case where the necessary function section 1100 is on, the application belonging to the additional function section 2100 is controlled according to situations.

The state of on or off of the necessary function section 1100 is changed on the basis of the own car travel information of the car controller 250, such as whether the car is traveling on an expressway or an ordinary road, when the mode is set. For instance, during traveling on an expressway, it is provided that there is no pedestrian on the expressway. Accordingly, it can be considered that allocation of processing of the processor to another function contributes to comfortable and safe driving for the driver instead of operating the pedestrian detection function. Therefore, the entire pedestrian detection application is turned off, and turning on and off of the application is controlled in order to place priority on another function and reduce one cycle of the processing time during high speed traveling. Instead, the on/off state may be changed by a method in which the user selects the state at a monitor screen of the navigation system.

The state of on or off of the additional function section 2100 is controlled on the basis of the own car travel information from the car controller 250 and recognition information from the application. In the case where the predicted processing time of each application dynamically predicted by the dynamic processing time prediction unit 111 is not completed within the prescribed cycle, it is scheduled so as to secure the prescribed cycle by turning off the additional application with a lower priority order to complete the processing within the prescribed cycle. Instead, the real-time feature and safety may be ensured by a simple method of degrading resolution of an image to be processed and degrading recognition accuracy.

The priority order indicates a priority order in the case of executing a plurality of applications. It is indicated that, the smaller the number is, the higher the priority of the application is. For instance, when the pedestrian detection application 140 finds a pedestrian candidate necessitating brake control and the processing time for detecting a pedestrian is extended, the processes of the additional applications having priority orders lower than those of the pedestrian detection function are stopped in an ascending order of priority. Thus, an attempt to sequentially stop the applications according to the priority order realizes compatibility between safety and convenience as much as possible.

An allocation core (CPU) is used in the case of designating allocation of a core (CPU) for taking charge of each function. In case the number of cores increases, the setting details of this task table are also used for allocation of a plurality of cores (CPU) to one function. In the case of dynamically changing allocation of the CPU according to a predicted result of the processing time, the setting details of the task table is rewritten. In the case of a single core or a single CPU, or also in the case of a multi-CPU of a parallel processing SMP allocating symmetrically and uniformly processes without determining charges of the CPU for a specific function, the allocation core is entirely set to one and no function is explicitly allocated to each core (CPU).

Figure 9:
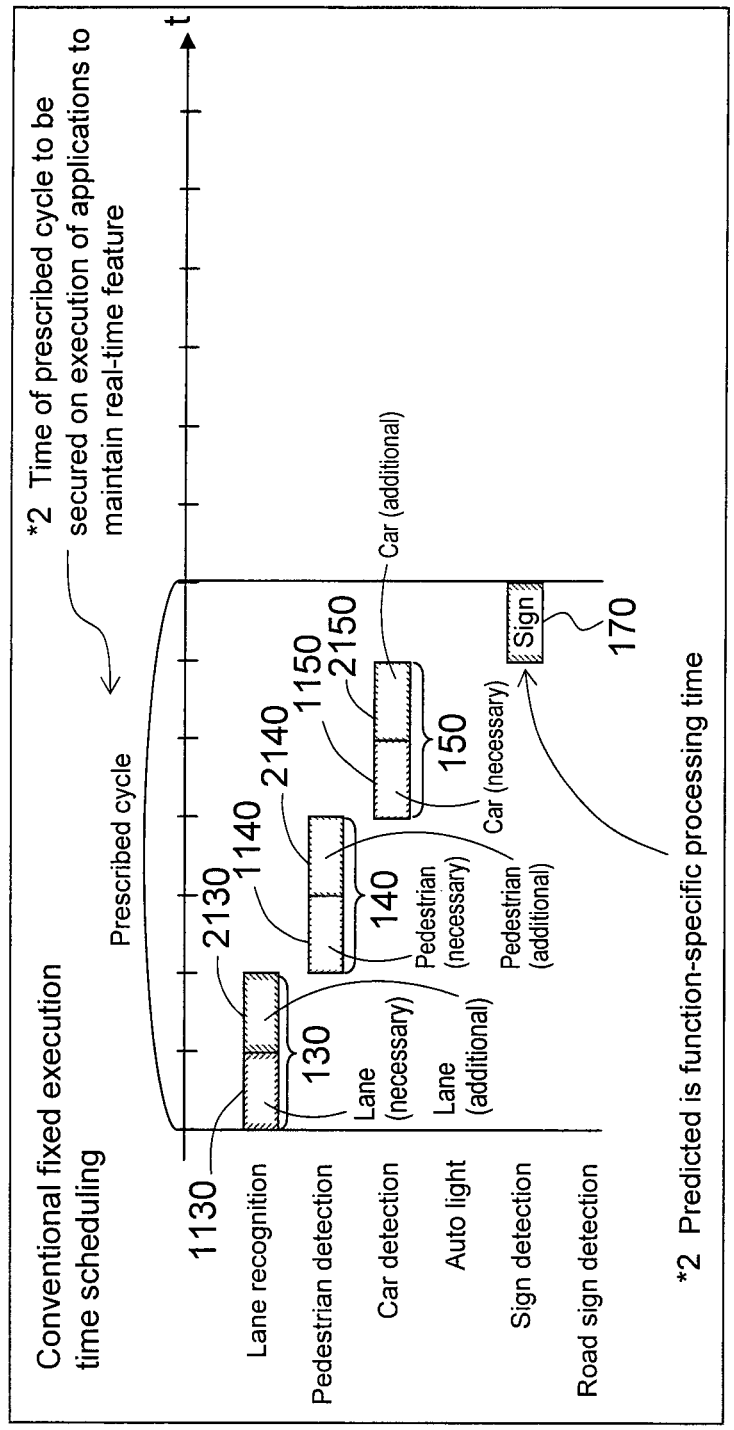
FIG. 9 is a diagram showing a result according to a conventional scheduling.

The processing represents the number of processes of the applications in the prescribed cycle, in which the processes of the applications are completed. The prescribed cycle in this image processing device represents a loop of one time of a series of processes, for instance, as shown in FIG. 9. A design is adopted in which the number of processes decreases with reduction of priority even on the same function. For instance, the processing [1/1] of the necessary application 1130 of the lane recognition application 130 shown in FIG. 7 represents one time of execution per cycle. The processing [⅓] of the auto light application 160 of the additional function section 2100 represents one time of execution per three cycles.

If it is determined that the processes of applications are unlikely to be entirely completed in the prescribed cycle on the basis of the predicted processing time, the applications are terminated from those having a low priority and the small number of processes. In many cases, this ensures execution of the applications having a high priority to secure the real-time feature, thereby ensuring safety.

For instance, the function of a part of calculating a curvature of the lane recognition 130 does not necessarily have a high processing cycle, in consideration that the curvature does not abruptly change. A high processing cycle improves accuracy. However, in the case where priority is to be placed on another process, the processing of [½] causes no problem. Change of the processing cycle is used as an adjustment item in the case where priority is to be placed on a certain function.

In the cases of the additional application 2140 of the pedestrian detection application 140, the additional application 2150 of the car detection application 150, the sign detection application 170 and the road sign detection application 180, reduction in processing cycle delays detection timing to a certain extent. It can be considered that the delay reduces the number of recognition processes after entrance into the detection distance to decrease the detection rate to a certain extent. In the case where priority is to be placed on another application more important despite the decrease in detection rate, adjustment of the processing cycle increases the processing cycle of the priority item but decreases the processing cycle of the non-priority item. In control of suppression of velocity during a curve, recognition of the curve for suppressing the velocity at a high cycle is important despite of decrease in rate of detecting road sign and the sign detection application 170 to a certain extent.

The resolution represents a size of an input image to be used for image recognition. The maximum resolution of an image taken by the camera imager 101 is represented as [1, 1]. According the representation method of [a, b], the symbol a represents a resolution in the lateral direction of the image and the symbol b represents a resolution in the vertical direction of the image. For instance, in the case of the maximum resolution of 768×240, the resolution of the necessary application 1130 of the lane recognition application 130 that accepts an input of an image of 256×240 is represented as [⅓, ½], which represents that the lateral resolution is ⅓ of the maximum resolution and the vertical resolution is ½ of the maximum resolution.

If it is determined that the processes of applications are unlikely to be entirely completed in the prescribed cycle on the basis of the predicted processing time, a process of reducing the resolution to reduce the processing time is executed. Reduction in resolution limits recognition targets to those in the proximity. Further, reduction in processing load due to reduction in resolution allows the processing time to be reduced. Even though the performance is degraded, it is necessary to ensure the real-time feature, while ensuring responsiveness, and to construct a safer and more comfortable car.

In the cases of the lane recognition application 130 and the pedestrian detection application 140 where importance is attached to the positional accuracy of the detection result and a more distant place is regarded as a detection target, it is preferable to use a high resolution image. However, increase in computation cost due to use of a high resolution image affects the processing cycle. Accordingly, the resolution is adjusted according to conditions, such as the detection positional accuracy, the detection target distance and the processing cycle.

For instance, in the case of assuming lane deviation avoidance, a certain extent of recognition accuracy is required for the lateral position of the lane and the yaw angle with respect to the car. However, the curvature value of the distant place and the lane position place more distant than the predicted lane deviation position is not important. In situations of car control for lane deviation avoidance, reduction in processing cost using a low resolution image increases the update cycle of the lateral position and the yaw angle. This increase realizes higher car control.

The detection distance represents the distance from the own car to the target at the most distant place among the targets to be recognized by each application. For instance, the fact that detection distance of the necessary application 1140 of the pedestrian detection application 140 in the ordinary mode is 40 meters [m] means that a pedestrian at a place more distant than that of 40 meters [m] is excluded from the detection targets.

As to the pedestrian detection application 140, in the case where a pedestrian having a high possibility of collision is recognized in the proximity and necessity of car control is predicted, it is not important to detect a distant place out of the target scope. Accordingly, omission of those at distant places reduces the processing cost, updates the pedestrian position at a high frame rate, and allows a higher collision avoidance control. The farther the detection distance, the more the processing time is required. Accordingly, change of the detection distance based on prediction of the dynamic processing time adjusts the processing time, thereby ensuring the real-time feature.

The initial processing time means a fixed processing time used for scheduling the application, and used in the case where prediction of the dynamic processing time fails and the case where the predicted processing time cannot be used. In the case of generating the task table and the case of selecting which application is operated according to a selection by the user, the initial processing time can be used as a standard for considering whether the processing is completed in the determined prescribed cycle or not. On the basis thereof, it can be checked whether the multi-application configuration that completes the processing in the prescribed cycle is realized or not.

The predicted processing time is a predicted time required to complete the process for each application function in each prescribed cycle or on occurrence of an event. For detection of a pedestrian, detection information and the like of the radar 261 is used to predict a time required to complete the process. The predicted processing time is used for scheduling the task.

<Description of Overall Processing Flow>

Next, an overall operation of the in-car-use multi-application execution device of this embodiment will be described using a processing flow shown in FIG. 10.

In step S0, information on a car control state, a state of executing multi-applications and the like is fed back. The information is a part of information used for predicting the processing time. The information of the car controller 250 is used for updating the task table and for predicting the processing time. The state of executing the multi-applications is used for predicting the processing, together with the recognition result. For instance, in the case of lane recognition, the size of processing region for lane recognition in the next cycle is fed back as information, thereby predicting the processing time.

In step S1, a process of acquiring travel environment information is executed. Here, the travel environment information is acquired from the direction indicator 213, the application operation 214, the navigation system 215, the radar 216, the road-car communication 217 and the car-car communication 218 shown in FIG. 3. The information is used for predicting the dynamic processing time and updating the task table.

In step S2, a process of predicting the dynamic processing time is executed. Here, the processing time for each application on which the validity flag is on in the task table is predicted using information on car travel situations and execution results and execution states of the multi-applications acquired in step S0 and the travel environment information acquired in step S1.

In step S3, scheduling is executed. The scheduling is executed on the basis of the information on the car control state and the execution results and execution states of the multi-application acquired in the step S0, the travel environment information acquired in step S1, the predicted processing time as the result of the prediction in step S2, and the task table.

In step S4, a process of correcting the task table is executed. Here, it is determined whether the details of the task table are required to be corrected or not on the basis of the result of the scheduling in step S3. If it is determined that the correction is required, the task table is corrected.

In step S5, a process of acquiring an image taken by the camera imager 101 is executed. In step S6, the multi-applications are executed on the basis of the result of the scheduling acquired in step S3 and the result of the task table acquired in step S4. In step S7, the car control is executed on the basis of the application execution result in step S6.

Steps S3 and S4 may be executed according to a method of simultaneous execution. For instance, the method may be a method according to which the task table is roughly determined on the validity flag, the priority order, the processing, the resolution, the detection distance and the like and subsequently the details of the task table is updated while scheduling is executed.

Instead, the method may simultaneously execute steps S2, S3 and S4. For instance, the processing time is predicted according to the priority order of the task table, and scheduling is executed on the basis of the predicted result. In a situation where the applications cannot be accommodated in the prescribed cycle, the method may review the validity flag of the task table, the processing cycle, the resolution and the detection distance again and subsequently redetermine scheduling.

<Detailed Processing Flow of Scheduling>

Next, details of the process in step S3 in FIG. 10 will be described using FIGS. 11 and 12. FIG. 11 is a processing flow illustrating an example of a scheduling method in detail. Here, description is made using an example of a case where operation means of the in-car-use multi-application execution device 100 is a single core or single CPU.

After prediction of the dynamic processing time in step S2, the processing proceeds to step S3. In step S3, scheduling is executed on the basis of the predicted processing time and the priority order listed in the task table. More specifically, if the processing times of applications enabled in the task table are scheduled in step S31, it is checked whether an application incapable of completing the process in the prescribed cycle exists or not.

If it is predicted that an application incapable of completing the process in the prescribed cycle exists (YES in step S31), the processing proceeds to step S34 in order to reduce the amount of information processing. In step S34, reduction in processing time due to degradation of accuracy of the application determined to be enabled and termination of the application are considered. In order to reduce a CPU load of lacking processing time, a part of the application as much as the lacking processing time is reduced or accuracy is degraded according to the lacking processing time, from the applications having a lower priority in an ascending order of priority, on the basis of the predicted processing time.

In step S35, a scheduling table (schedule) is determined according to the scheduling determined in steps S34 and S38. Only if the process is not completed in the prescribed cycle even if all the convenience applications (the process of the additional function section 2100) are stopped, extension of the processing cycle is considered and the schedule is corrected. Even with the safety application (the process of the necessary function section 1100), if significant extension of the processing time beyond the prescribed cycle is predicted, the termination process may be executed and the application may be executed in the next prescribed cycle.

In the case of the in-car-use recognition application where real-time response of the system is important, the detection distance is an important element. The detection cycle is also an important element. It can be understood that adherence to the prescribed cycle is important also for ensuring safety in the case of car control based on the result of certain milliseconds old at the maximum and the case of car control designed in consideration of the execution result to be acquired in certain frames of processing cycles.

On the other hand, if it is predicted that the processes of the respective applications are completed in the prescribed cycle (NO in step S31), the processing proceeds to step S37, it is determined whether the CPU available time is sufficient or not. If it is determined that the CPU available time is sufficient (YES in step S37), the processing proceeds to step S38 in order to realize higher convenience and considers addition of convenience functions (additional applications 2130 to 2150, the auto light application 160, etc.) within an extent capable of completing the processes within the available time. In step S37, if it is determined that the CPU successively has another available time, reduction in processing cycle itself is also considered in step S38. This reduction allows higher safety and recognition accuracy to be realized.

If it is determined that the CPU available time is short (NO in step S37), it is determined that the optimal scheduling has already been achieved and the processing proceeds to step S5 in order to continue the processing as it is.

Figure 10:
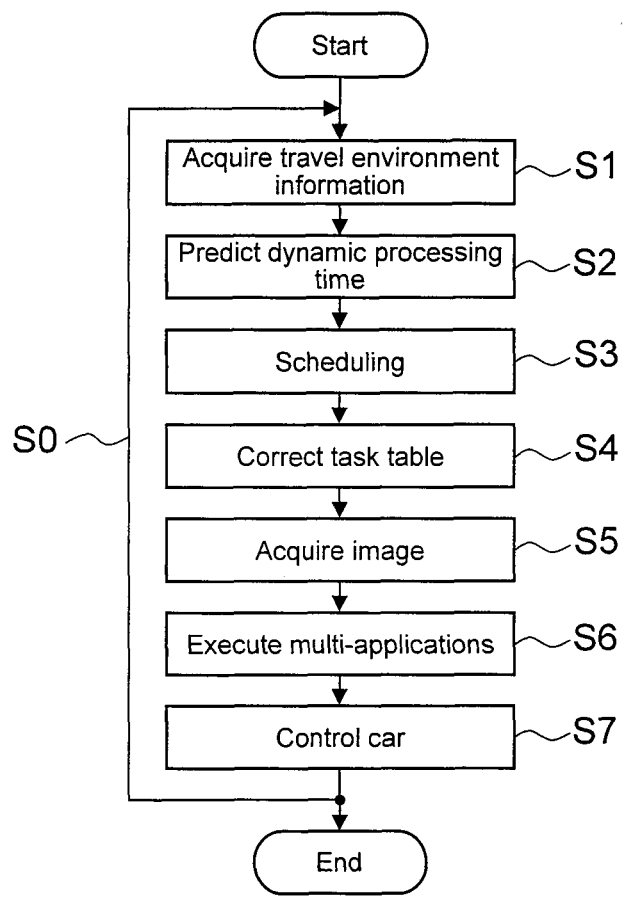
FIG. 10 is a processing flow illustrating an in-car-use multi-application execution method of this embodiment.
Figure 11:
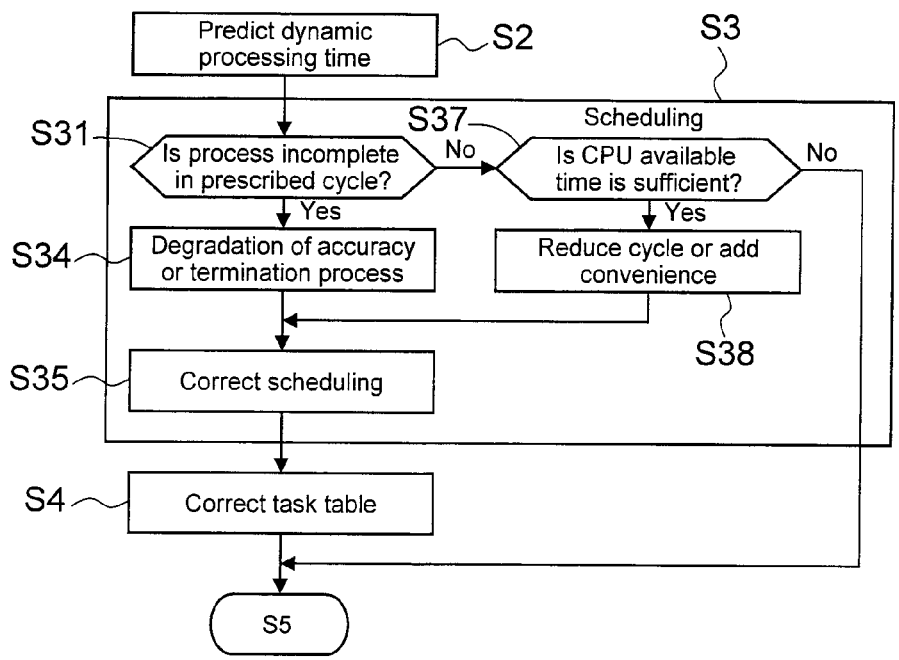
FIG. 11 is a processing flow illustrating an example of scheduling in accordance with the embodiment.
Figure 12:
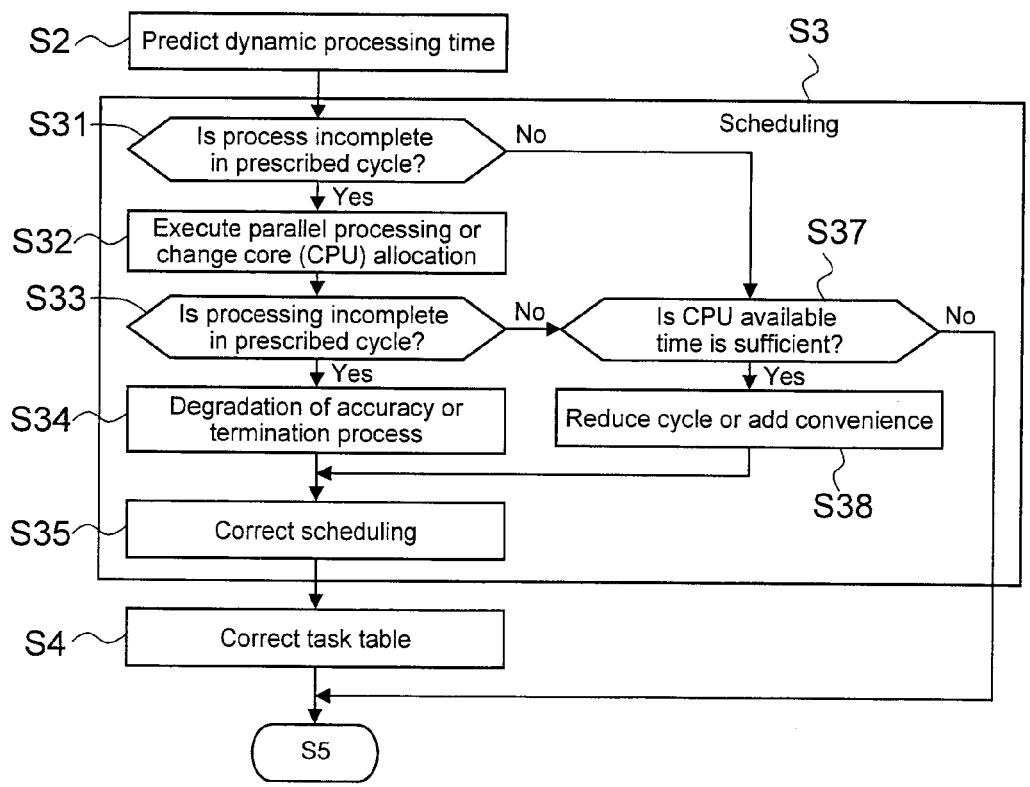
FIG. 12 is a processing flow illustrating another example of scheduling in accordance with the embodiment.

FIG. 12 is a processing flow illustrating another example of the scheduling method in step S3 in FIG. 10. Here, the description is made using a case where the operation means of the in-car-use multi-application execution device 100 is a multi-core or a multi-CPU. The same symbols are assigned to steps having analogous contents of those in FIG. 11. The detailed description thereof is omitted.

In step S31, if it is predicted that the processing is incomplete in the prescribed cycle (YES in step S31), the processing proceeds to step S32 and it is checked whether or not an available processing time exists in another core, another CPU or dedicated hardware. If it is determined that an available time is exists, it is further checked and determined whether or not the allocation of core (CPU) to each application can be changed or whether or not functions having a long processing time complete the entire functionality in the prescribed time by executing parallel processing. The allocation of the cores is changed and scheduling for parallel processing is executed so as to complete the safety functions and applications having a higher priority in a descending order.

In step S33, it is determined whether only changing of the allocation of the CPU and parallel processing complete the processes of the respective applications in the prescribed time or not. If it is determined that the processes are not to be completed (YES), the processing proceeds to step S34 in order to reduce the amount of information processing. If it is determined that the processes are to be completed (No), the processing proceeds to step S37. In step S35, the schedule is determined according to the scheduling determined in step S32, S34 or S38.

If it is determined that the CPU available time is short in step S37 (NO), it is then determined that the scheduling has already been optimal and the processing is executed as it is. It may be predicted how much processing time is required in the case of restarting including stopped functions whose validity flags are OFF, the entire processing time may be predicted, and scheduling may be executed according to an descending order of priority on the basis of the task table previously determined by selection of the travel environment mode or the application operation.

At a time when a function being executed beyond the end of the last prescribed processing cycle exists, the schedule is corrected on the basis of the priority order of the application and the predicted result of the dynamic processing time. This can prevent execution of the process and occurrence of a termination process, which is to be executed even though it is apparent that the process is not completed in the prescribed processing cycle. Measures of adding an application that does not cause a termination process and has a low priority order but has a short processing time may be taken, thereby adding convenience.

There is an application which is appropriate to be consecutively executed in consideration of difference of an image to be used. Accordingly, it is sometimes difficult to execute scheduling only with the level of the priority order. In such a case, a method is also appropriate that acquires the predicted result of the dynamic processing time and executes scheduling and subsequently redetermines which application is enabled to thereby execute scheduling from the beginning.

<Processing Time Prediction Method>

Next, a method of predicting the dynamic processing time in step S2 in FIG. 10 will be described in detail for each application. The description is made according to the order of the pedestrian detection application 140, the car detection application 150, and the lane recognition application 130.

For instance, in the case of the pedestrian detection application 140, there are a fusion scheme jointly using the radar 216 and the camera device, and a scheme only with camera device and a scheme only with the radar 216. In the fusion scheme, the radar 216 detects a pedestrian candidate in the radar field and processes an image only in an image region corresponding to the pedestrian candidate. Accordingly, in the case with no pedestrian candidate, no image processing load occurs and the processing load is significantly low. In contrast, in the case of many pedestrian candidates, there are many image regions where it is considered that pedestrian candidates exist. Accordingly, the image processing load becomes high.

Thus, the amount of image processing can be estimated from the result of the radar. Accordingly, estimation of the processing time (prediction of the processing time) can correctly be executed. Increase and decrease in processing time are significantly high according to increase and decrease in the number of pedestrian candidates. Accordingly, scheduling using the dynamically predicted result of the processing time exerts an advantageous effect on suppressing delay in the processing cycle. More specifically, if the processing time is long and the processing time of an application which rapidly increases and decreases can correctly be predicted, the scheduling according to increase and decrease in the processing time can be controlled.

Accordingly, prediction of the dynamic processing time is not necessarily executed on every application. Processes having a substantially constant processing time or a short processing time is scheduled on the basis of a fixed processing time, and dynamic prediction is execute on processes, such as detection of a pedestrian, having a processing time rapidly increasing and decreasing, which improve advantageous effects of dynamic prediction. In the case where the processing load is high and the processing time is long, the termination process is suppressed by terminating the process or degrading accuracy of the process, reducing the detection distance, and reducing the processing rate from the process having a low priority order in an ascending order, and scheduling is executed so as to secure the prescribed processing cycle of the multi-applications, thereby maintaining the real-time feature and further increases safety. In contrast, in the case where the processing time is short, there are advantageous effects that efficiently allow operation of another convenience function and further improve convenience.

In the fusion scheme, according to a method of integrating the image recognition result and the recognition result of the radar 216 with each other instead of a method of narrowing down the image processing region from the result of the radar 216, a part of the image processing load is identical to the processing time prediction method of the method only with the camera device. The advantageous effect is also equivalent.

In the case only with the camera device, the size on a screen when the own car approaches the pedestrian at the own car velocity is predicted on the basis of a previous recognition result, and a load of the image processing in the next processing cycle is estimated on the basis of the size, thus predicting the processing time. Further, for allocation to a pedestrian newly entering into the visual field, an allowance time is added.

In comparison with the fusion scheme, the processing time prediction accuracy is degraded, and the allowance time is always added to the scheduling. It is difficult to realize scheduling with a processing time which is substantially zero. The advantageous effect is reduced in comparison with that in the fusion scheme. However, as described above, the scheduling using the dynamically predicted result exerts advantageous effects of terminating the processes with a lower priority in an ascending order, suppressing the termination process owing to degradation in accuracy, and suppressing delay in processing cycle, according to increase in processing time. A significantly short processing time enables another convenience functions to efficiently operate, thereby allowing the convenience to be further improved. Such prediction of the processing time exerts analogous effects even if the prediction is executed in the detection of a pedestrian by the radar 216.

As with the pedestrian detection application 140, the car detection application 150 is classified into a fusion scheme and a scheme only with the camera device. Prediction of the processing time and advantageous effects are substantially analogous. Accordingly, the description thereof is omitted.

Next, a method of predicting the processing time in the case of the lane recognition application 130 will be described. The processing time of the lane recognition application 130 is affected by the size of the processing region. Particularly, in the processing time, importance is attached to a line extraction process that searches for at which inclination and position a lane mark (white line WL on the road) in the processing region exists.

The larger the processing region is, the more the number of candidates of the positions and inclinations increases, which in turn increases the processing time. The processing region in the next prescribed cycle is set on the basis of the previous recognition result. Accordingly, with reference to information on the size of the processing region set for the prescribed cycle, the processing time is predicted. It is less likely that the road situations abruptly change. Accordingly, the processing time in the prescribed cycle may be estimated from the previous processing time. Instead, a method may be adopted according to which information on a lane type and a road environment is acquired from map information of the navigation system (hereinafter simply referred to as navigation) mounted on the car, and the processing time is predicted from these results. Another method may be adopted that refers the map information using a storing device of the navigation, records the processing time of the previous travel in the storing device, and utilizes the recorded time for predicting the processing time in the case of the next traveling.

The result of recognition of the lane by the lane recognition application 130 is used for car control. Accordingly, delay in control is an important problem. Accordingly, the processing time is predicted, scheduling is executed so as to accommodate the lane recognition application 130 in the prescribed processing time, and executes safe control of preventing deviation from the lane.

Next, methods of predicting the dynamic processing time in cases of the auto light application 160, the sign detection application 170 and the road sign detection application 180 will be described. In the case of the auto light application 160, the fusion scheme including the detection information of the radar 216 is adopted, which limits the processing region to a region where it is considered that the car candidate exists and predicts the processing time for detecting lights. It is considered that, the processing time does not significantly change in the image processing in the auto light, and the processing time in the next cycle may be predicted from the previous processing time.

In the cases of the sign detection application 170 and the road sign detection application 180, information on the positions of road signs and signs is acquired from the map information of the navigation. Estimation may be made such that it is determined that much processing time is required for the timing when it is estimated that road signs and signs are imaged. After recognition, the size of the sign recognized again in the next prescribed cycle on the image may be estimated from the car velocity and steering information, and the processing time may further accurately be estimated. In the above cases, the processing time may be predicted on the basis of the result of the processing time on own car traveling in conformity to the map information.

In the cases of the sign detection application 170 and the road sign detection application 180, it is considered that it is less likely that the time for the image processing significantly changes, and the processing time in the next cycle may be predicted from the previous processing time.

In the case of another application, for instance, a parking frame detection application, It is less likely that, after processing one time, the processing time significantly different from that in the next prescribed cycle. Accordingly, a method may be adopted that predicts the processing time in the next prescribed cycle on the basis of the previous processing time.

In the case of an application of detecting dozing in the cabin, the process has modes, and, only on suspected dozing, the mode may be changed so as to increase the processing load. The processing time may be predicted from the mode state. The processing mode in the application of detecting dozing may be changed according to steering by the driver and the braking operation, and the processing time may be predicted according to the processing mode.

In the case of a window fogging detection application, the processing time for detecting window fogging may be detected on the basis of humidity. The prediction may be made on the basis of the result of detection of rain drops. The process may be determined to be snow detection or rain detection on the basis of the measurement result by a thermometer, and the processing time may be predicted.

<Termination Process>

Next, the method of a termination process will hereinafter be described in detail. FIG. 13 is a diagram illustrating a problem of conventional scheduling. FIG. 13 (*a*) shows a method of securing the prescribed cycle by a termination process. FIG. 13 (*b*) shows a method of extending the cycle to complete each scheduled application. FIG. 14 is a diagram illustrating a scheduling method of this embodiment. FIG. 14 (*a*) shows a method of securing the prescribed cycle by stopping the application of the additional function section on the basis of the priority order. FIG. 14 (*b*) shows a method of permitting extension of the cycle to a prescribed value.

The conventional method schedules each function on the basis of the initial processing time in FIG. 7 that is fixedly allocated, as shown in FIG. 9. However, extension of the processing time for a certain function beyond the initial processing time causes various problems. For instance, there are measures of executing a termination process for securing the prescribed processing cycle. However, as with the car detection application 150 shown in FIG. 13 (*a*), the application whose process is terminated in the midway cannot acquire the result. Further, as with the sign detection application 170, the application scheduled to be executed thereafter, for instance, the sign detection application 170, is not executed either and the processing resultantly enters into the next cycle.

As shown in FIG. 13 (*b*), in the case of the conventional method that extends the cycle until the processes of all the applications are completed, the prescribed cycle is not ensured, which causes a problem in real-time feature.

There is another conventional method that schedules functions according to the priority order and terminates processes with a low priority order for securing the prescribed cycle. However, this termination process does not consider the processing time of the present cycle.

Accordingly, for instance, as with the necessary application 1150 of the car detection application 150 shown in FIG. 13 (*a*), when an application having a long processing time is executed immediately before the end of the prescribed cycle, a termination process resultantly occurs, any result of the necessary application 1150, the additional application 2150 and the sign detection application 170 of the car detection application 150 is not acquired according to the scheduling.

Such a conventional method has a problem for use in an in-car-use application for protection and safety. Thus, scheduling capable of securing convenience while securing a real-time feature is preferable. In the case as shown in FIG. 13 (*a*), the safety function should be executed in the first place. Unfortunately, if the actual processing time is longer than the fixed processing time assumed by the pedestrian detection application 140 and the car detection application 150, a problem occurs in that even the process of the necessary application 1150 of the car detection application 150 is also terminated.

In contrast, this embodiment executes scheduling using the task table in FIG. 7 and the predicted processing time. Accordingly, in consideration of the priority order, the pedestrian detection (additional) 2140 is preferably executed after the necessary application 1140 of the pedestrian detection application 140, the necessary application 1150 of the car detection application 150, the necessary application 1130 and the additional application 2130 of the lane recognition application 130. However, if the dynamic processing time is predicted, it can be determined in advance that the process is not completed within the prescribed cycle.

In such a case, as with the car detection application 150 shown in FIG. 13 (*a*), if the process of the application is not completed and a termination process occurs, the car detection (additional) 2150 having the next priority among the functions to be completed in the prescribed cycle should be scheduled.

However, in FIGS. 13 and 14, the schedules are adopted that same applications are processed consecutively as much as possible in consideration of not only the level of the priority order. This is based on an idea that even if the same application is divided into processes with little data dependency, the processes share many pieces of information in consideration of saving and reloading and has high efficiency in terms of the processing load. For instance, necessary and additional versions of the pedestrian detection share many pieces of information. In consideration of saving the information after completion of the necessary function and reloading the information at the start of the additional version, consecutive execution of the same applications is effective also in terms of the processing load and the amount of memory consumption. However, in the case of attaching the greatest importance to suppression of a termination process, it is preferable to execute the applications according to the priority order. In the end, the schedule is determined in comparison with the load of executing the application, according to the level of the load to occur by division of the applications and importance of suppressing termination of the task.

Figure 25:
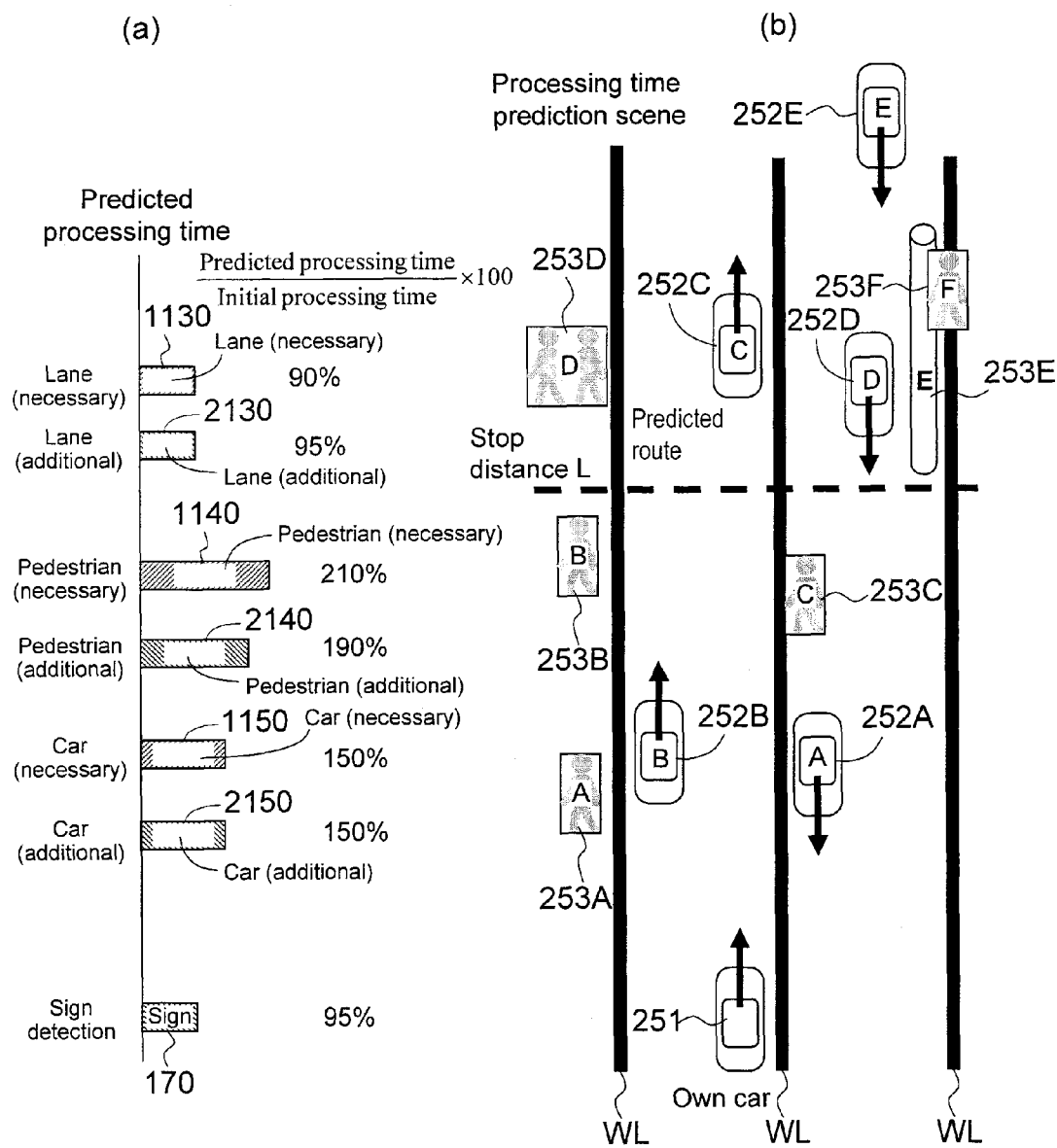
FIG. 25 is a diagram illustrating a method of calculating a predicted processing time.

FIG. 25 (b) shows an ambient environmental scene of a car in the case of FIG. 13. FIG. 25 (b) is a diagram illustrating a method of calculating a predicted processing time, and shows situations in which pedestrians 253A to 253F and cars 252A to 252E exist in front of an own car 251.

Figure 26:
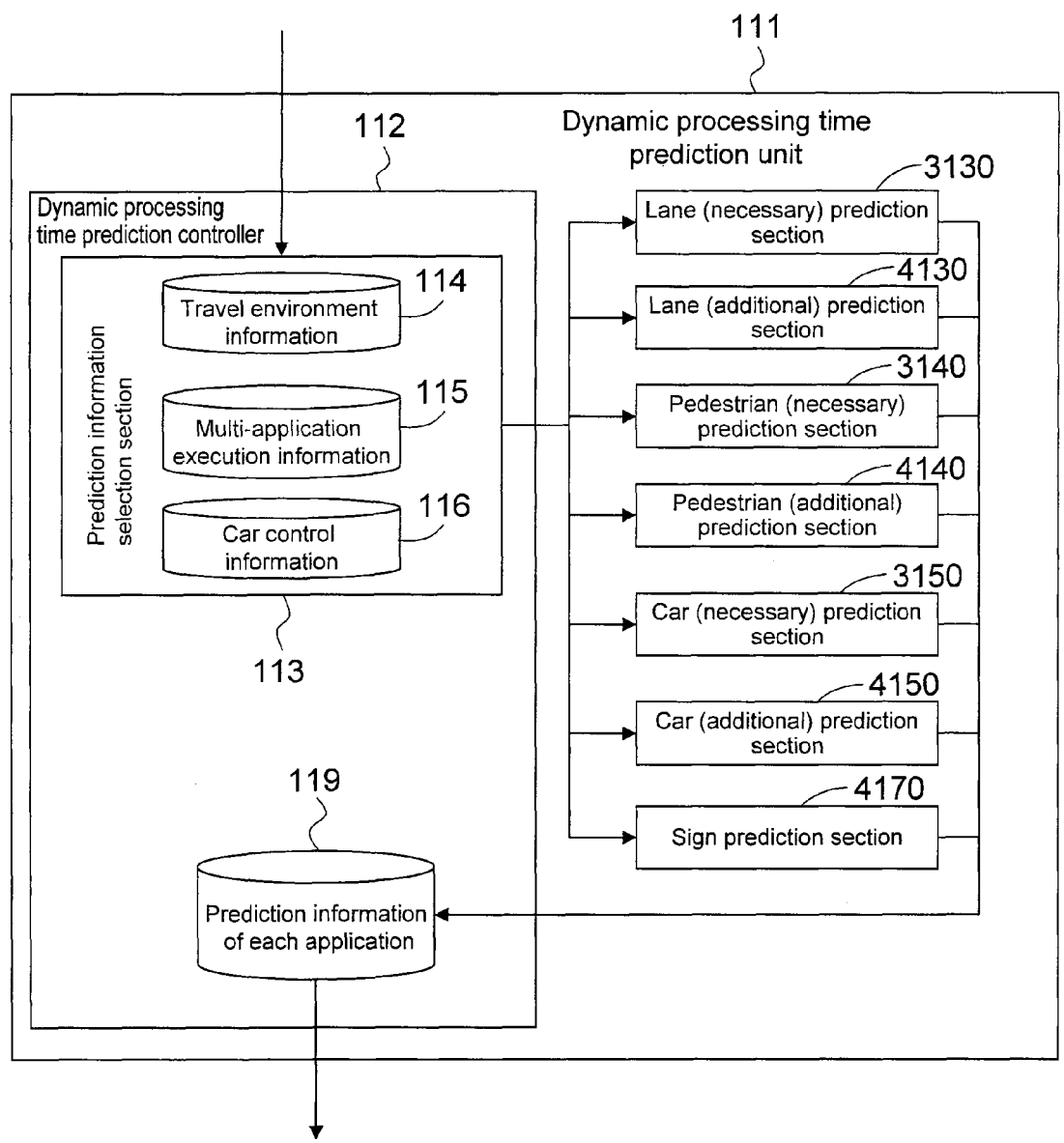
FIG. 26 is a block diagram of a dynamic processing time prediction unit.

First, the dynamic processing time prediction unit 111 predicts the processing time for each application. As shown in FIG. 26, a prediction information selection section 113 in the dynamic processing time prediction controller 112 saves information acquired as inputs from the travel environment information unit 210, the multi-application execution unit 131 and the car controller 250, as travel environment information 114, multi-application execution information 115 and car control information 116. Information to be used for predicting the dynamic processing time is selected from the thus stored information, for each application, and the information is transmitted to dynamic prediction sections (3130 to 3150 and 4130 to 4170).

The processing time of the necessary application 1130 of the lane recognition application 130 is predicted. Here, the processing time of the necessary application 1130 of the lane recognition application 130 is predicted using the size of the processing region from the processing result in the previous prescribed cycle from the multi-application execution information 115, and the previous recognition result.

For determining the size of the next processing region from the size of the processing region in the previous prescribed cycle and the recognition result, the information thereof is utilized. Further, information on lane recognition situations of continuation of the state without recognition is also utilized. In the case of the continuous state without recognition, it is predicted that the processing time is extended because the processing region is enlarged to execute the recognition process. Thus, the processing time of the necessary application 1130 of the lane recognition application 130 is predicted using the size of the processing region and a history of the previous recognition results. FIG. 25 (a) shows a processing time ratio that is the predicted processing time divided by the initial processing time and multiplied by 100.

The ratio exceeding 100 means that the initially set schedule cannot be secured. In this scene, the processing ratio of the necessary application 1130 of the lane recognition application 130 is predicted as 90%.

Instead, information on road situations may be acquired from the navigation system of the travel environment information. The information is on whether the road is a smooth road as with continuation of a solid line or a road unlikely to be detected due to difficulty of recognition such as Botts' dots. The processing time may be predicted such that, in the case of the smooth solid line, the recognition result is stable and can be tacked and thereby the processing time is short, and, in the case of the Botts' dots, detection is impossible or stable detection is difficult and thereby the processing time is long. Instead, a method of predicting the processing time may be adopted that predicts the position of the white line WL in the next cycle from the car velocity and the yaw angle of the car control information such that, in the case of the solid line, a processing time does not change, and, in the case of a broken line, the positions of the broken line and blank part in the next cycle are predicted. FIG. 25 (a) shows a percentage of the length of the predicted processing time in the case of consideration based on the initial processing time. It is predicted that the necessary application 1130 of the lane recognition application 130 is 90%.

Next, the processing time of the additional application 2130 of the lane recognition application 130 is predicted. Here, as with the necessary application 1130, the size of the processing region in the next prescribed cycle is determined using the size of the processing region and the recognition result of the additional application 2130 of the lane recognition application 130 in the preceding cycle from the multi-application execution information 115, and the processing time is predicted from the size of the processing region and the history of the recognition results. As with the necessary version, the processing time may be predicted from the recognition situations, road situations and road curvature information from the car travel information navigation, and information on the car velocity and the yaw angle of the car control information 116. In the case of FIG. 25 (b), the processing time ratio of the additional application 2130 of the lane recognition application 130 is predicted as 95%.

Next, a method of predicting the processing time of the pedestrian detection application 140 will be described. As shown in FIG. 25 (b), in a stop distance range as a target of car control and in a travel prediction route, three pedestrians 253A to 253C exist, and three pedestrians 253D and 253F exist at a further distant place. A value detected by the car velocity sensor 261 of the car controller 250 is used as the stop distance range.

The three pedestrians 253A to 253C are detected as pedestrian candidates in the stop distance range where car control operates by the radar 261 of the travel environment information unit 210, and three pedestrians 253D and 253F and a utility pole 253E are detected as candidates at the further distant place.

The existence of the pedestrian candidates 253A to 253F, the distances, directions and object widths of the candidates 253A to 253F from the own car 251 can be detected from sensor information of the radar 261. Accordingly, the sizes and processing ranges of the pedestrian candidates 253A to 253F on an image can be calculated. This determines the processing region on which the pedestrian candidates 253A to 253F are searched for on the image.

On the basis of the direction, the object width and the distance, the processing region on the image is determined. According to the distances to the pedestrian candidates 253A to 253F, the image in the processing region is normalized. Pattern matching is executed according to the thus normalized size and the pedestrians are detected. Accordingly, the processing time is predicted from the processing load of the image normalization and the processing load of the pattern matching.

The image is thus normalized from the distance to the pedestrian. Accordingly, a significant difference in height affects the detection rate of the pattern matching. Accordingly, a method may be adopted that executes pattern matching on the same pedestrian candidate according to a plurality of sizes. Even in such a case, it is suffice that the method predicts the processing time according to the number of times of normalization and the number of times of pattern matching. Thus, according to the method of the pedestrian detection, in consideration of the processing loads of the image normalization and the pattern patching, the processing time of the necessary application 1140 of the pedestrian detection application 140 is predicted.

The additional application 2140 predicts the processing time of each of the pedestrian candidate 253D to 253F. The process is analogous to that of the necessary application 1140.

However, at the distant place out of the stop distance range, the pedestrian candidate who looks small on the image is regarded as a target. Accordingly, the load of image normalization is reduced. The processing load of the pattern matching is not significantly changed. According to the information, in this scene with many pedestrians, the processing load increases in both the necessary application 1140 and the additional application 2140. As shown in a graph of the predicted processing time in FIG. 25 (a), the processing time ratios of the necessary application 1140 and the additional application 2140 are 210% and 190%, respectively. The predicted processing time significantly increases in comparison with the initial processing time.

Next, a method of predicting the processing time of the car detection application 150 will be described. The car detection application 150 executes processes that cause the necessary application 1150 to detect a car candidate as a control target and cause the additional application 2150 to detect the other cars.

The radar 216 of the travel environment unit 210 detects the car candidate, and also detects the relative velocity, the direction and the car width. The car control information 116 divides the car candidates into car candidates as targets of the necessary version and car candidates as targets of the additional version. In a scene shown in FIG. 25 (b), the car candidates 252A and 252B are regarded as recognition targets of the necessary application 1150, and car candidates 252C to 252E are regarded as recognition targets of the additional application 2150.

As with the pedestrian detection, a processing region in which the car candidates are taken on an image is set. The image in the processing region is normalized according to the distance from the own car. In order to execute pattern matching at a determined pattern size of a car, the processing time is predicted according to the image normalization and the number of times of the pattern matching. In the scene in FIG. 25 (b), the necessary application 1150 and the additional application 2150 of the car detection application 150 have a processing time longer than an ordinary case. It is predicted that the processing time ratio of each of the necessary application 1150 and the additional application 2150 is 150%.

Next, a method of predicting the processing time of the sign detection application 170 will be described. Prediction in the next prescribed cycle is executed according to the processing time in the previous prescribed cycle of the multi-application execution information 115. The pedestrian detection application 140 and the car detection application 150 may adopt such a method.

For the sake of prediction, the size of a sign on the image in the next prescribed cycle may be estimated from the information on the car velocity and the yaw angle of the car controller 250 to thereby predict the processing time. On a target that can continuously be detected by tracking, such prediction of the processing time can be executed. The processing time of a sign to be newly detected cannot be predicted. Thus, the predicted processing time is acquired by adding an allowance to the processing time predicted from the previous detection history. In the scene in FIG. 25 (b), it is predicted that the processing time ratio of the sign detection application 170 is 95%.

The processing time is then predicted from information selected by the prediction information selection section 113 for each application. Data is temporarily stored in each of application prediction information 119. Next, use of the predicted processing time of each application allows prediction of incompletion of the process in the prescribed processing cycle or continuation of the process even after the prescribed cycle, before execution of the application.

Thus, as shown in FIG. 14(a), execution of the additional application 2140 of the pedestrian detection application 140 and the sign detection application 170, which are convenience functions with a low priority order, are stopped, using the result of the predicted processing time, and another process with a high priority is executed. Accordingly, inclusion of the processes with high priorities in the prescribed cycle is successfully achieved. Dynamic prediction of the processing time suppresses occurrence of a termination process on the safety function.

There is a scheduling method that, as with the car detection application 150 shown in FIG. 13 (b), in order to avoid acquiring no result due to the termination process, extends the processing cycle, abandoning completion in the prescribed processing cycle. However, this method causes a problem in real-time feature where the prescribed processing cycle cannot be secured. In such a case, there is a scheduling method in FIG. 14 (a) of securing the prescribed cycle using the priority order and the dynamically predicted processing time, as described above. As shown in FIG. 14 (b), the scheduling permitting extension of the prescribed cycle to the prescribed value may be executed, which does not permit a long delay of the processing cycle while reducing the termination process as much as possible. This enables the real-time feature for safety to be secured while maintaining convenience.

As described above, in scheduling, the process with a long processing time is likely to cause an idle time and frequently cause a termination process, and is thus a process difficult to handle from a standpoint of scheduling.

Next, a case of dividing and executing the task of the scheduled application (task division) will hereinafter be described.

Figure 15:
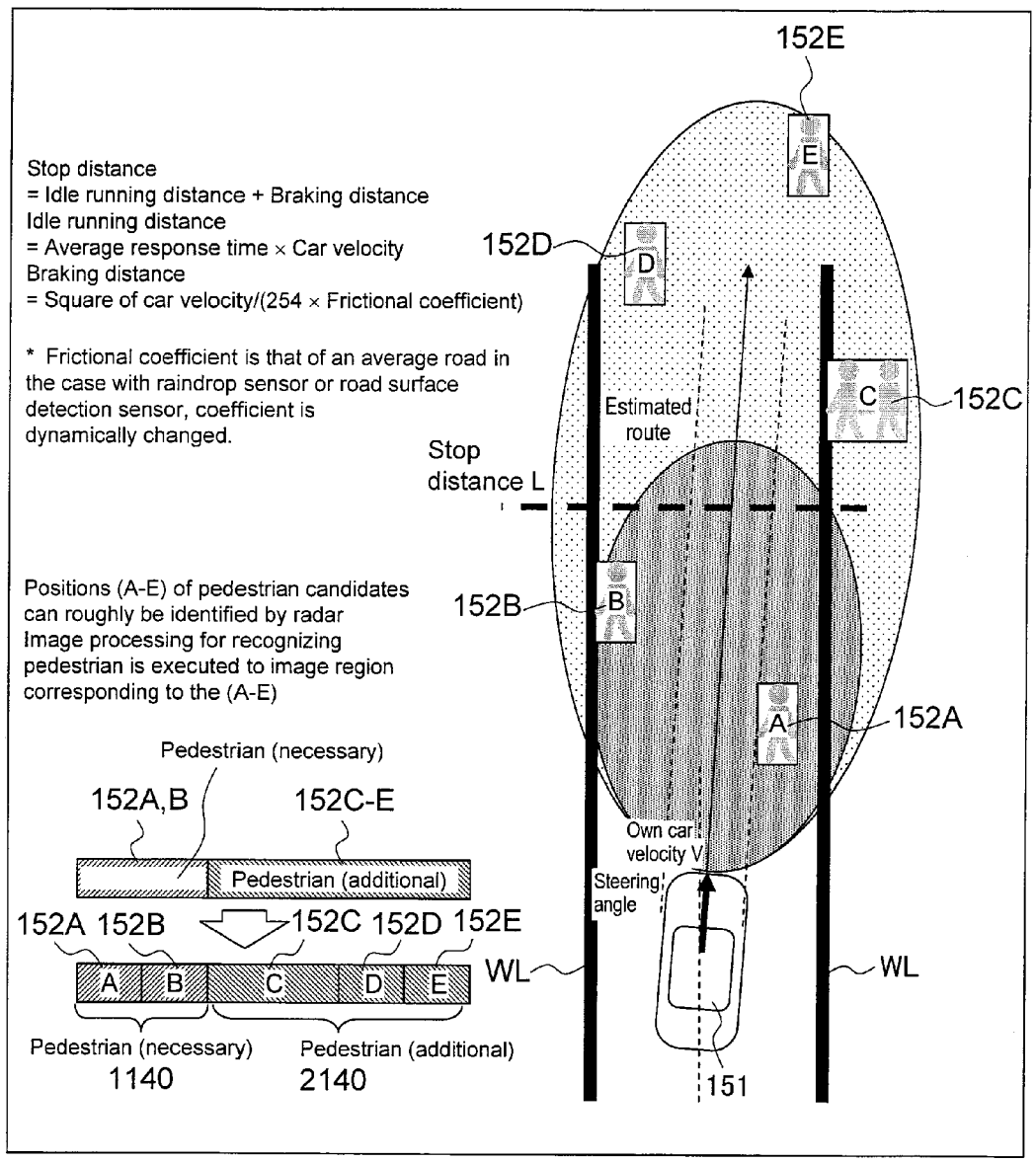
FIG. 15 is a diagram illustrating an example of a pedestrian detection method of this embodiment.
Figure 17:
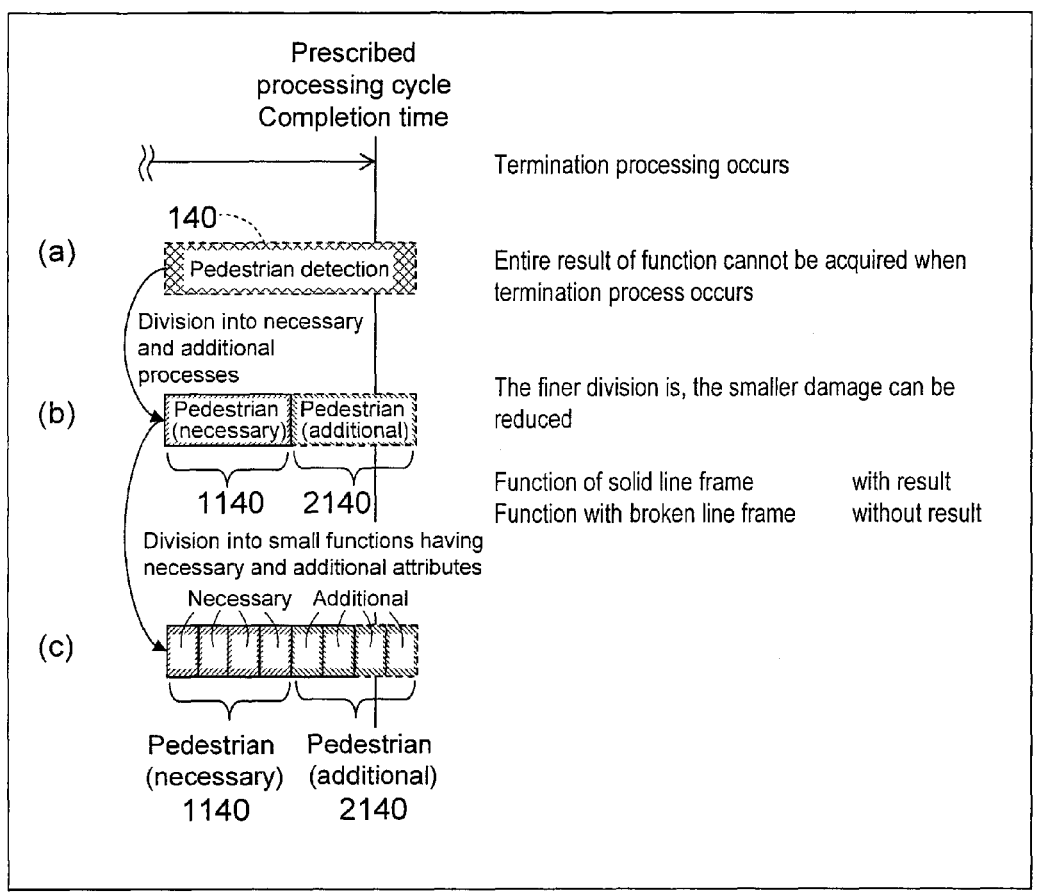
FIG. 17 is a diagram illustrating another example of the pedestrian detection method of this embodiment.

As measures against a termination process and for flexible support by scheduling, a method of dividing and executing the task of the application may be adopted. FIGS. 15 and 17 are diagrams illustrating an example of the pedestrian detection method. FIG. 15 is a diagram illustrating a positional relationship between the own car and pedestrians. FIG. 17 is a diagram illustrating a difference of cases with and without division of the task when a termination process is executed on completion of the prescribed cycle.

A pedestrian is detected by the fusion scheme using the radar 261 and the camera device. For instance, on the basis of information on the car velocity V and the steering angle of the own car and a detection result of the radar 261, the positions of pedestrian candidates 152A to 152E are identified. Image processing is executed on the image region of pedestrian recognition corresponding to each of the pedestrian candidate 152A to 152E.

A stop distance L shown by a broken line in FIG. 15 is calculated by adding an idle running distance and a braking distance to each other (stop distance=idle running distance+braking distance). The idle running distance is calculated by multiplying an average response time from the drivers' recognition of a pedestrian to a braking operation by the car velocity (idle running distance=average response time×car velocity). The braking distance is calculated on the basis of the square of the car velocity and the frictional coefficient (braking distance=square of car velocity/(254×frictional coefficient)). The frictional coefficient is the frictional coefficient of an average road. In the case where the car includes a raindrop sensor or a road surface detection sensor, the coefficient may dynamically be changed on the basis of the sensor values.

For instance, as shown in FIG. 17 (a), in the case where the pedestrian detection application 140 is adopted as one application, if a termination process in the midway is executed, the result of the pedestrian detection cannot be acquired. In order to divide functions into functions of safety related to car control and functions of convenience that regards the distant place as the detection target and is for calling attention but does not directly related to car control, the functions are classified into the necessary application 1140 and the additional application 2140, as shown in FIG. 17 (b).

Thus, in the case of, for instance, execution of the termination process in the midway of the additional application 2140, the division of one application into the necessary application 1140 and the additional application 2140 avoids expanding damages by the termination process beyond the convenience of the additional application 2140. This can suppress adverse effects from exerting on the safety functions of the necessary application 1140.

However, even though the application is divided into two pieces, the result of the application cannot be acquired at all by incompletion of only the last a few percents of the application. Thus, as shown in FIG. 17 (c), the application is divided into processes for the respective pedestrian candidates 152A to 152E detected by the radar 216, which allows the result to be output at the point of time of completion of the recognition process.

As shown in FIG. 17, this division into the processes for the respective candidates of the recognition targets suppresses a lack of the recognition result by the termination process to the minimum, and makes the scheduling flexible. Such fine division into the processes allows fine adjustment based on the predicted result of the processing time in consideration of up to which candidate pedestrians can be detected in the prescribed processing cycle. In the example shown in FIG. 17, in addition to the recognition result of the necessary application 1140, a recognition result of the additional application 2140 on another pedestrian can further be acquired.

Figure 16:
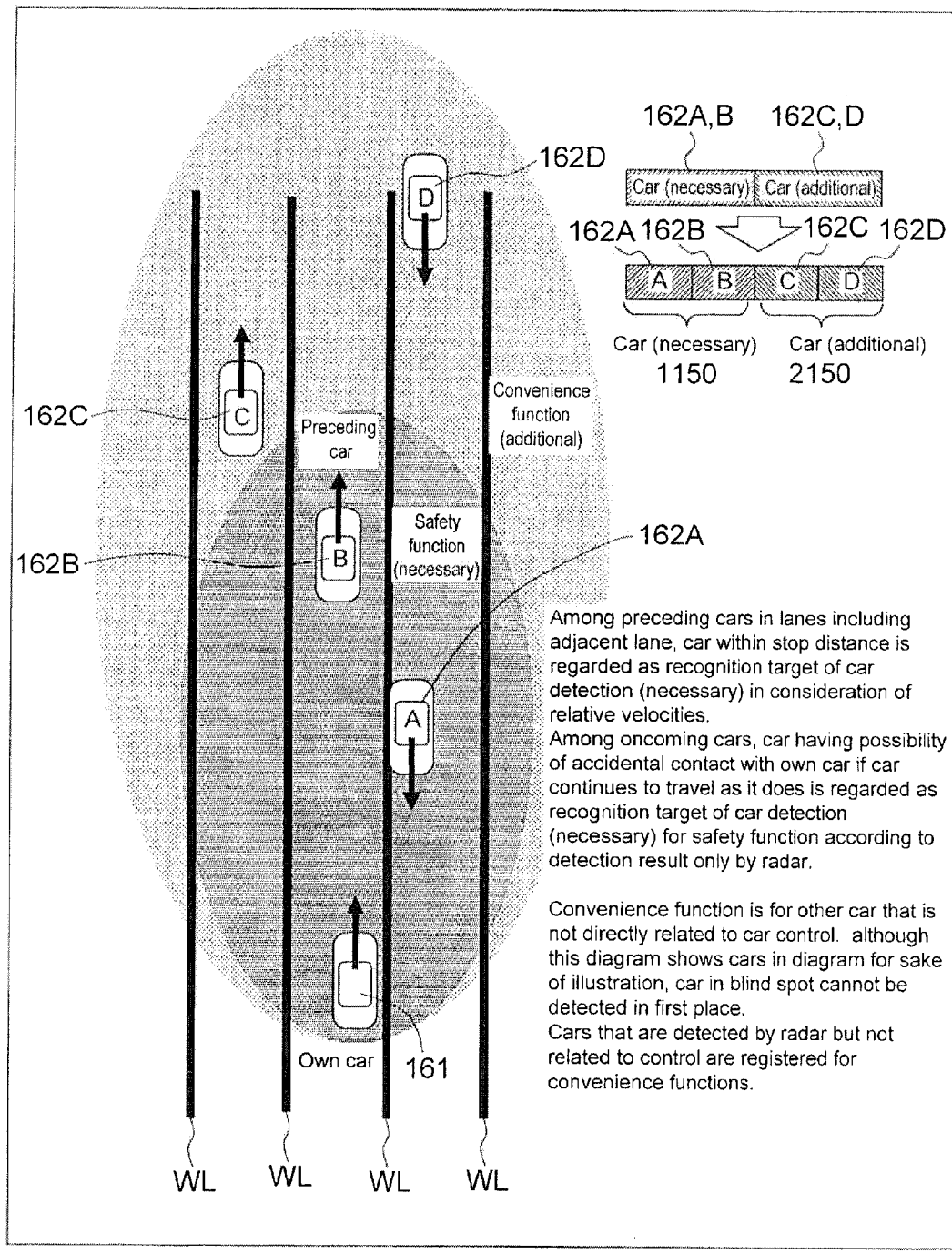
FIG. 16 is a diagram illustrating an example of a car detection method of this embodiment.

FIG. 16 is a diagram illustrating an example of a car detection method, and illustrates a positional relationship between the own car and cars around the own car.

The car is detected by the fusion scheme using the radar 261 and the camera device, as with the pedestrian detection. For instance, the positions of the car candidates 162A to 162D are identified on the basis of the information on the car velocity and the steering angle of the own car 161 and the detection result of the radar 261. Image processing on the car recognition is applied to the image region corresponding to each of the car candidates 162A to 162D.

Here, the configuration of registering the detection of the preceding cars 162B and 162C related to the car control and the car A on the adjacent lane that exists within the stop distance in consideration of the car velocity and has a high collision risk as the safety function and registering the others as the convenience function is kept, and the image recognition task on the car candidates 162A to 162D detected by the radar 261 is divided into pieces for the respective car candidates.

As to the preceding cars 162B and 162C in the lanes including the adjacent lane, the car 162B existing within the stop distance in consideration of the relative velocity is regarded as the recognition target of the necessary application 1150 of the car detection application 150 for the safety function. As to the oncoming cars 162A and 162D, according to the detection result only by the radar 261, the car 162A having a possibility of an accidental contact with the own car 161 if the cars continue to travel in this condition is regarded as the recognition target of the necessary application 1150 of the car detection application 150 for the safety function. The cars 162C and 162D that are detected by the radar 261 and not directly related to the car control of the own car 161 are regarded as the recognition targets of the additional application 2150 of the car detection application 150 for the convenience function.

Such division into one piece of processes for each car candidate as the recognition target suppresses a lack of the recognition result due to the termination process, and makes the scheduling flexible. Such fine division into processes allows fine adjustment in consideration of up to which car can be detected in the prescribed processing cycle on the basis of the predicted result of the processing time.

Figure 18:
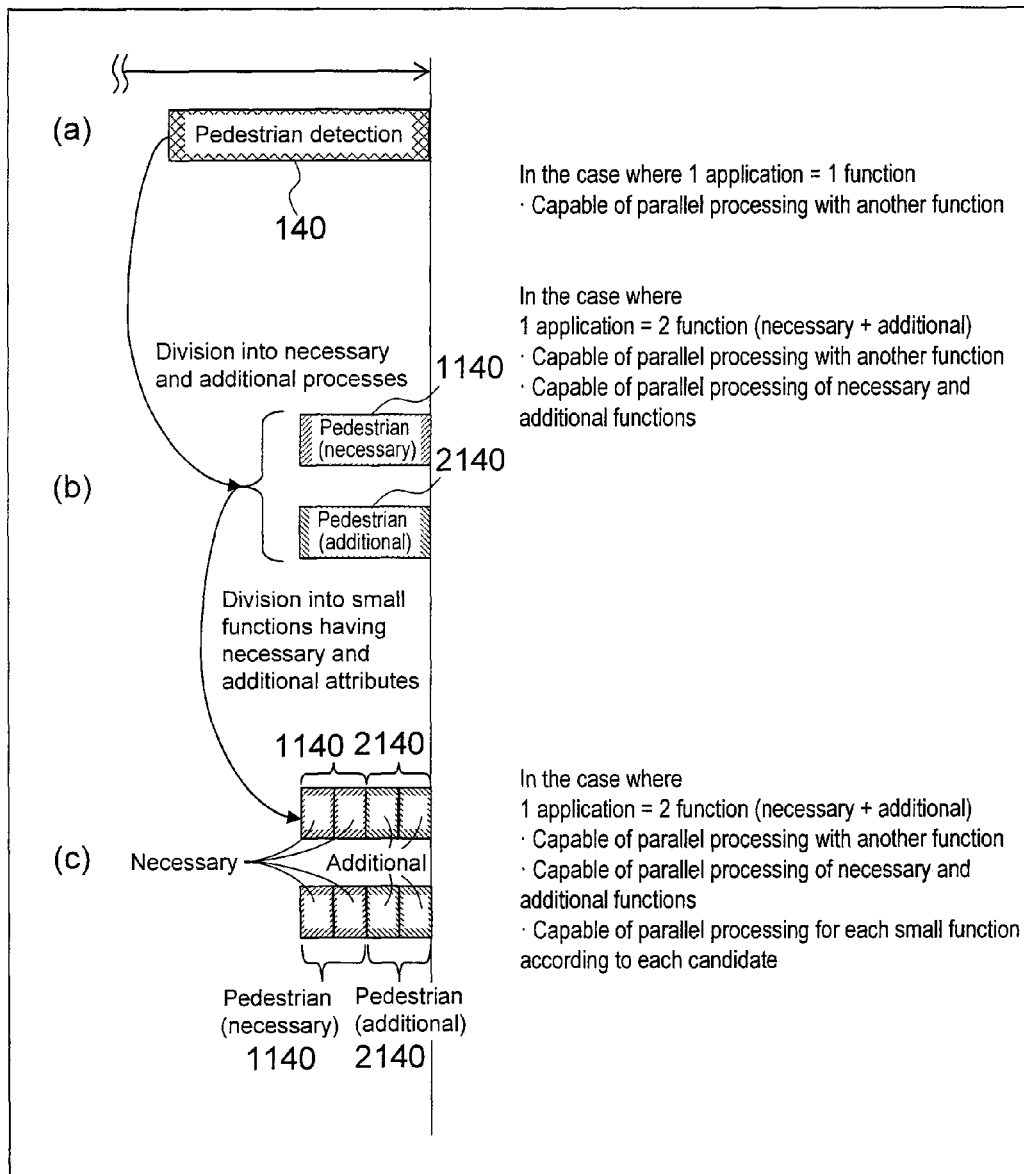
FIG. 18 is a diagram illustrating operation and advantageous effects of parallel processing by function division of this embodiment.

FIG. 18 is a diagram illustrating operations and advantageous effects of the parallel processing by the task division. Division of the task of the application for each candidate of the pedestrians or cars allows division into processes having little interdependency of data. This facilitates the parallel processing, allows flexible scheduling in consideration of the parallel processing even with the same application in the case of the system configuration using the multi-core or the multi-CPU, and supports completion of the safety function. Further, it is expected that the prescribed cycle is secured and the convenience function is added.

As to the task consuming a large memory, such as image processing, job transfer that switches allocation of the CPU in the midway of the task and temporary saving the task due to occurrence of an interrupt often becomes a processing load on the CPU. Thus, by the CPU allocation can be switched in an interval of divided tasks without job transfer between the CPUs by downsizing the task, which allows more flexible scheduling. The downsizing of the task enables the memory consumed by each task to be suppressed, and succeeds in reducing the risk of the processing load in the case of occurrence of temporary saving.

For instance, as shown in FIG. 18 (a), in the case where the pedestrian detection application 140 can realize the pedestrian detection function (one application can realize one function), parallel processing with another function becomes possible. As shown in FIG. 18 (b), in the case where the pedestrian detection application 140 can realize two functions: the necessary application 1140 and the additional application 2140 (one application can realize two functions), the application can be processed in parallel. As shown in FIG. 18 (c), in the case of division into tasks having an attribute of necessary or additional version, each task can be processed in parallel.

Figure 19:
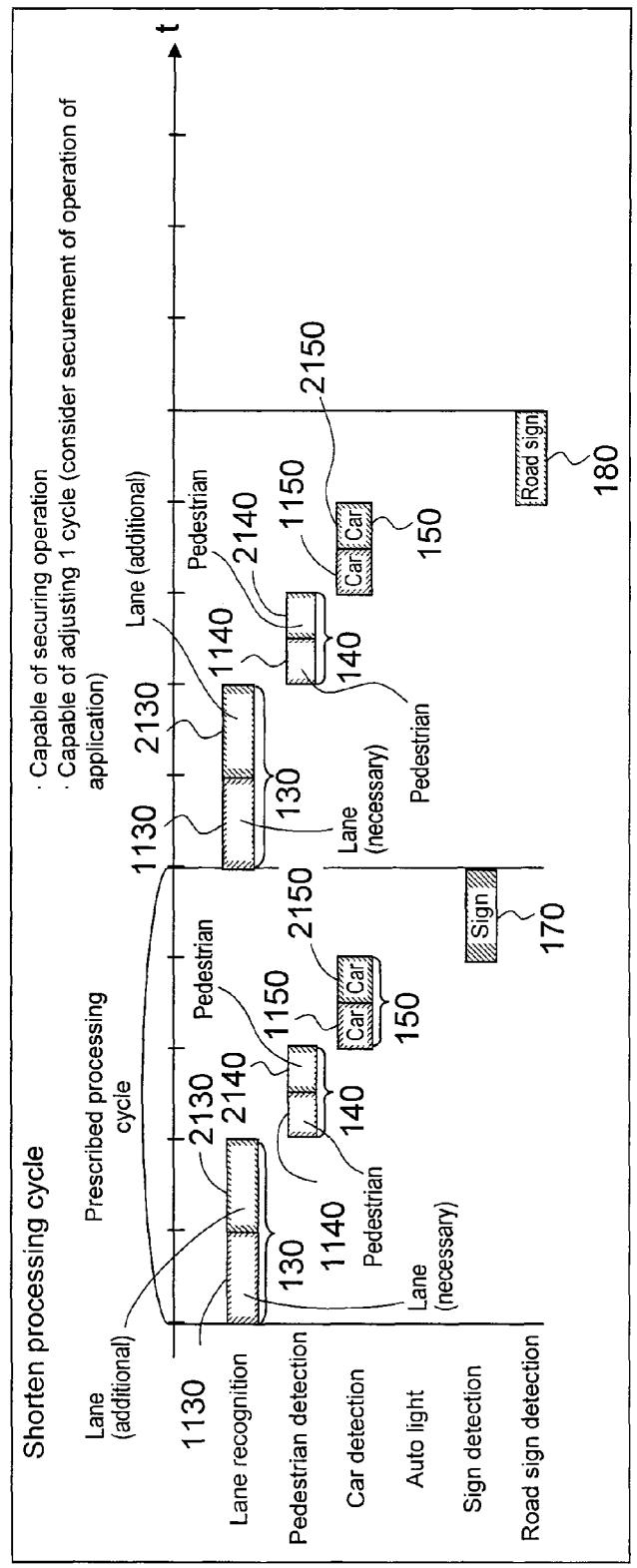
FIG. 19 is a diagram illustrating scheduling for shortening a processing cycle of this embodiment.

Next, a method of reducing the prescribed cycle will be described. In the case where the predicted processing time is shorter than the prescribed cycle even with execution of the functions of the entire task table or the case of continuation of a short processing cycle on the basis of the prediction of the dynamic processing time, reduction of the processing cycle as shown in FIG. 19 allows the car to be controlled highly accurately and stably.

The higher the car velocity or the nearer the car approaches the lane, the more the processing cycle is increased, which realizes control with a higher performance. In this case, it is determined whether an allowance of the processing time is in the present cycle or not. If the allowance of the processing time is not therein, measures for reducing the processing load are taken on the basis of the results of the priority order of the task table, the resolution and the result of the detection distance. If the allowance of the processing time is therein and the state is continuously stable, reduction of the prescribed processing time as it is reduces a detection interval and improves the detection reliability, accuracy and detection speed.

In the case of travel on a suburb or an expressway with no pedestrian and car therearound for a long period, there is a high possibility that a state with an allowance of the processing time continues for a long period. In such situations, shortening the processing cycle to increase the accuracy improves safety in comparison with the case of leaving the allowance of the processing time. Instead, inclusion of the convenience functions, such as the sign detection and road sign detection, improves the convenience.

Next, a power consumption adjustment mode will be described. In the case of incompletion of the processing within the prescribed processing cycle according to the processing time of each predicted function, adjustment of the power consumption adjusts the performance of the CPU (clock speed, the number of operating cores, the number of operating CPUs) so as to complete the process in the prescribed processing cycle.

In the case of completion of the process in the prescribed processing cycle with surplus time, the mode is changed to a low power consumption mode. In contrast, in the case of incompletion of the process in the prescribed processing cycle due to a high processing load, measures are taken according to which the power consumption is increased and the CPU performance is improved so as to complete the process in the prescribed processing cycle. The prediction of the processing time avoids situations where the process cannot be executed in time at urgency, and reduces the power consumption as much as possible when the processing load is low.

Figure 20:
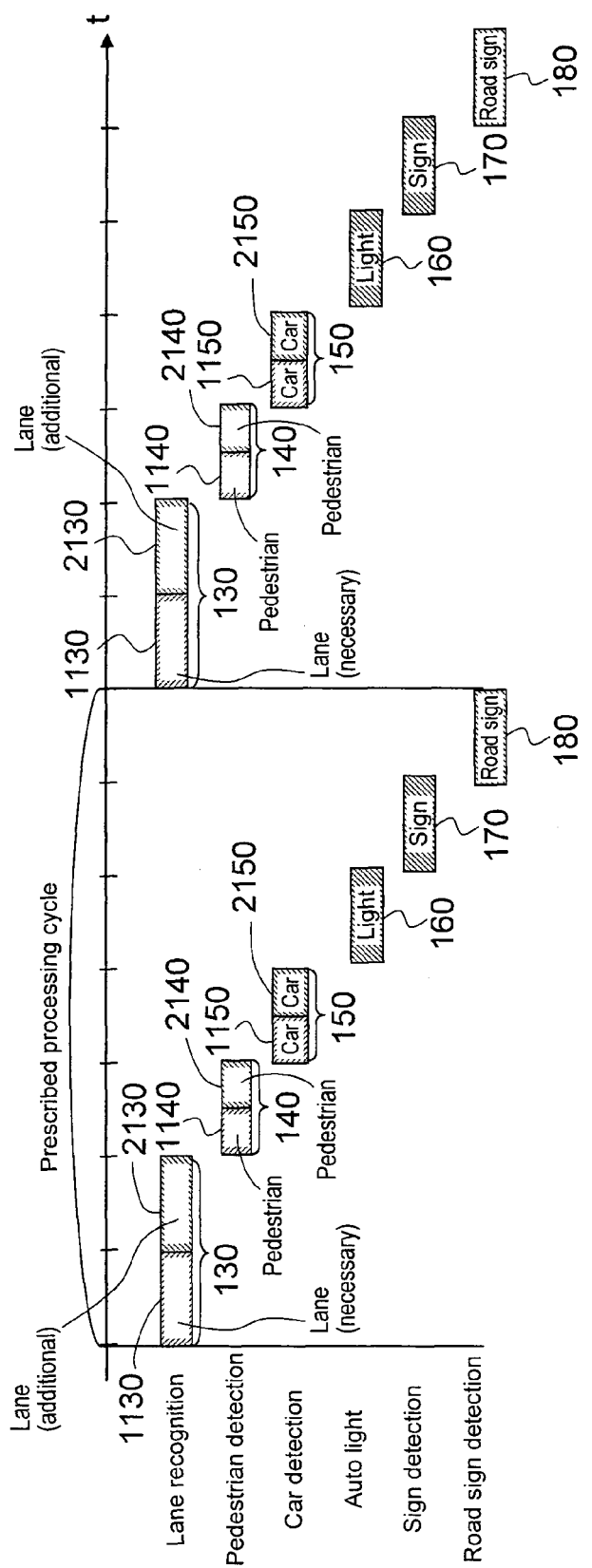
FIG. 20 is a diagram illustrating scheduling for adding convenience of this embodiment.

FIG. 20 is a diagram illustrating a scheduling method of adding convenience. In the case where the predicted processing time becomes shorter than the prescribed processing cycle even with execution of the functions of the entire task table on the basis of the prediction of the dynamic processing time, or the case of continuation of a short processing cycle, the convenience functions, such as the auto light application 160 and the road sign detection application 180, are added to be accommodated in the prescribed cycle as shown in FIG. 20. This allows convenience to be improved while securing safety.

In the cases of the convenience functions, such as the raindrop detection, the window fogging detection, and the auto light for turning on and off headlights and adjusting the optical axes of the lights, necessity of processing in each prescribed cycle and observing change of states is low. A possibility that a delay of about a few seconds until automatic start of windshield wipers on raining causes inconvenience for the user is low.

Accordingly, only in the case where the dynamically predicted processing time of the safety function is relatively short and to be completed within the prescribed cycle, even the schedule of the priority order that operates the raindrop detection, the window fogging detection, auto lights and the like sufficiently exhibits effectiveness of the convenience function.

However, in the cases of changing determination states, such as a transitional period from the fair weather to rain, the weather with cloud to that without cloud, and a transitional period from day to night, it is preferable to execute the final determination after repeating a several times of determinations in order to reduce misdetection. During such a state transition period, the CPU available time is positively utilized, if any, to operate a detection logic, thereby improving convenience without degrading the safety functions.

The application can be selected by, for instance, user's execution from an operational screen of the navigation. In application registration, scheduling is executed on the basis of the initial processing time of each function. A design is adopted according to which the necessary safety functions and additional functions for convenience are registered so as to complete the processes in the prescribed processing cycle. The acceptance of registration of the necessary functions is finished when the total processing time of the necessary functions of the registered functions exceeds one, which is a prescribed time. The addition of the application is finished when the total processing time of the necessary functions and the additional function exceeds two, which is a prescribed time.

However, at this time, each function is scheduled at fixed processing time. Accordingly, it is difficult to determine whether the process is completed in the prescribed processing cycle or not in actual traveling and whether the CPU available time is sufficient or not. Particularly, in the case of the pedestrian detection application 140 or the car detection application 150 is registered as the safety function and the pedestrian candidate or the car candidate detected by the radar 261 does not exist, the processing time becomes about zero and the CPU available time becomes significantly large.

It is a matter of course that it is predicted that the CPU available time becomes significantly long because the scheduling on registering the application is made on the basis of the processing time in the case where the detection candidate exists. Particularly, at a place, such as a suburb, with little car or pedestrian, the CPU is not fully used all the time.

In such a case, increase in processing cycle, improvement in performance of the safety function or addition of the convenience function effectively utilizes the CPU, which improves the convenience of the user. Some cases can be assumed where the processing load is high according to the scheduling on registration of the application to frequently cause incompletion of the process in the prescribed cycle. In such a case, the scheduling is adjusted by notification to or selection by the user on removal of registration having a low priority order in an ascending order in terms of adjusting the scheduling.

The schedule may be adjusted according to the method on installing the application or newly adding the application. In consideration of maintenance, preparation of many task tables by a designing side causes a heavy load on a designing operation. Automatic optimal design of the task tables in conformity to scenes and preference of the user allows system design respecting convenience and intention of the user while considering safety.

<Change of Core Allocation, Scheduling, Two CPUs>

Using modes of a multi-core and a multi-CPU includes an AMP (asymmetric multiprocessing) allocating a specific function and OS to a specific core or CPU, an SMP (symmetric multi-processing) sharing memory among individual cores or CPUs according to an equal condition, and a BMP (bound multiprocessing) having portability of the AMP and flexibility of the SMP by means of one OS allocating a certain task to a specific core or a CPU to execute the task.

In the AMP and BMP capable of allocating a specific function to the core or the CPU, such scheduling using dynamic prediction time process can further improves safety and convenience. In the cases of the SMP and the AMP, a configuration incapable of allocating the function to another core or another CPU only has advantageous effects and operation analogous to those of the single core and a single CPU.

Figure 21:
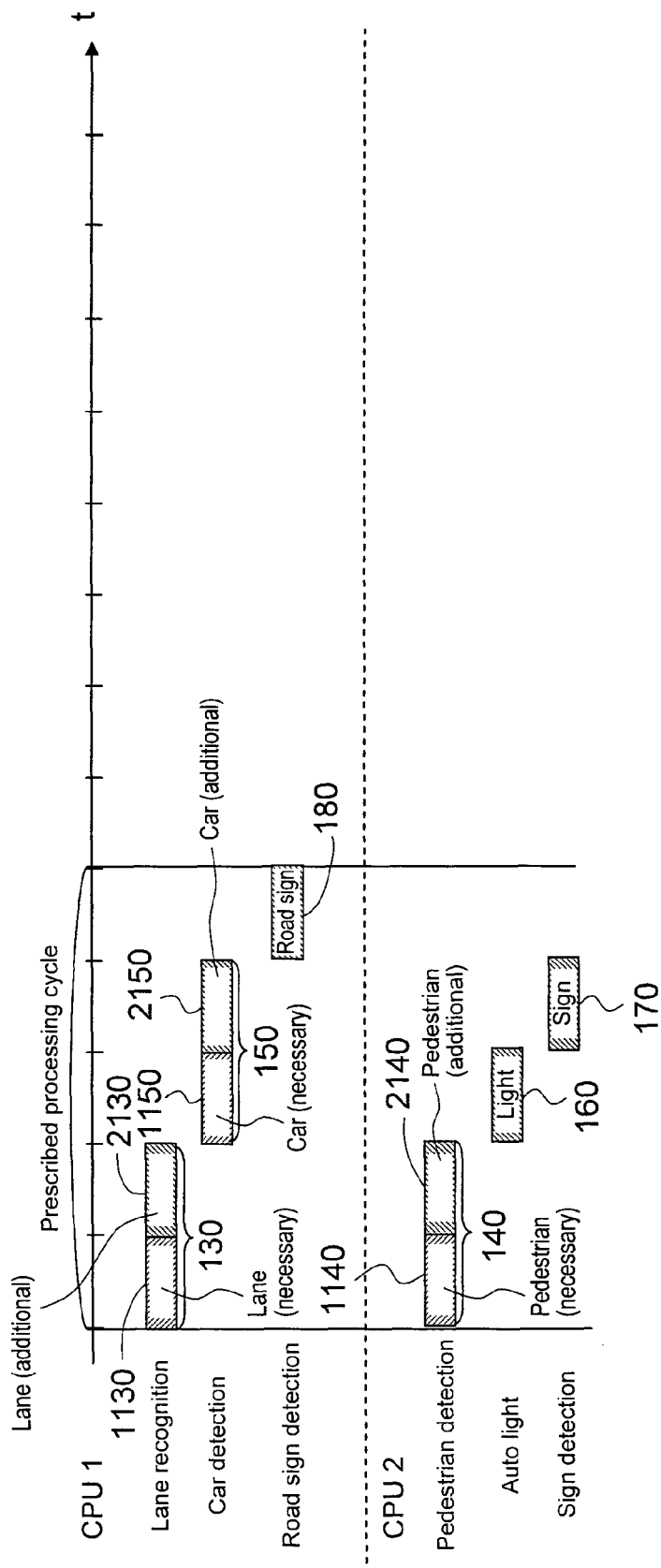
FIG. 21 is a diagram illustrating an example of scheduling in multi-cores (two cores (CPU) in the ordinary case)

The conventional scheduling allocates the process to each core (CPU) on the basis of the processing time fixed to the function, as shown in the two cores and ordinary case in FIG. 21. In FIG. 21, the processes are allocated such that the upper part is to the core 1 (CPU 1) and the lower part is to core 2 (CPU 2). As shown in the two cores (CPU) and ordinary case in FIG. 22 (*a*), in the case where the necessary application 1150 of the car detection application 150 does not complete the process even after the end of the prescribed cycle, the processes of the applications (the additional application 2150 of the car detection application 150 and the road sign detection application 180) in the prescribed cycle of the CPU 1 thereafter do not complete and the prescribed cycle should be extended or the termination process should be executed.

Figure 27:
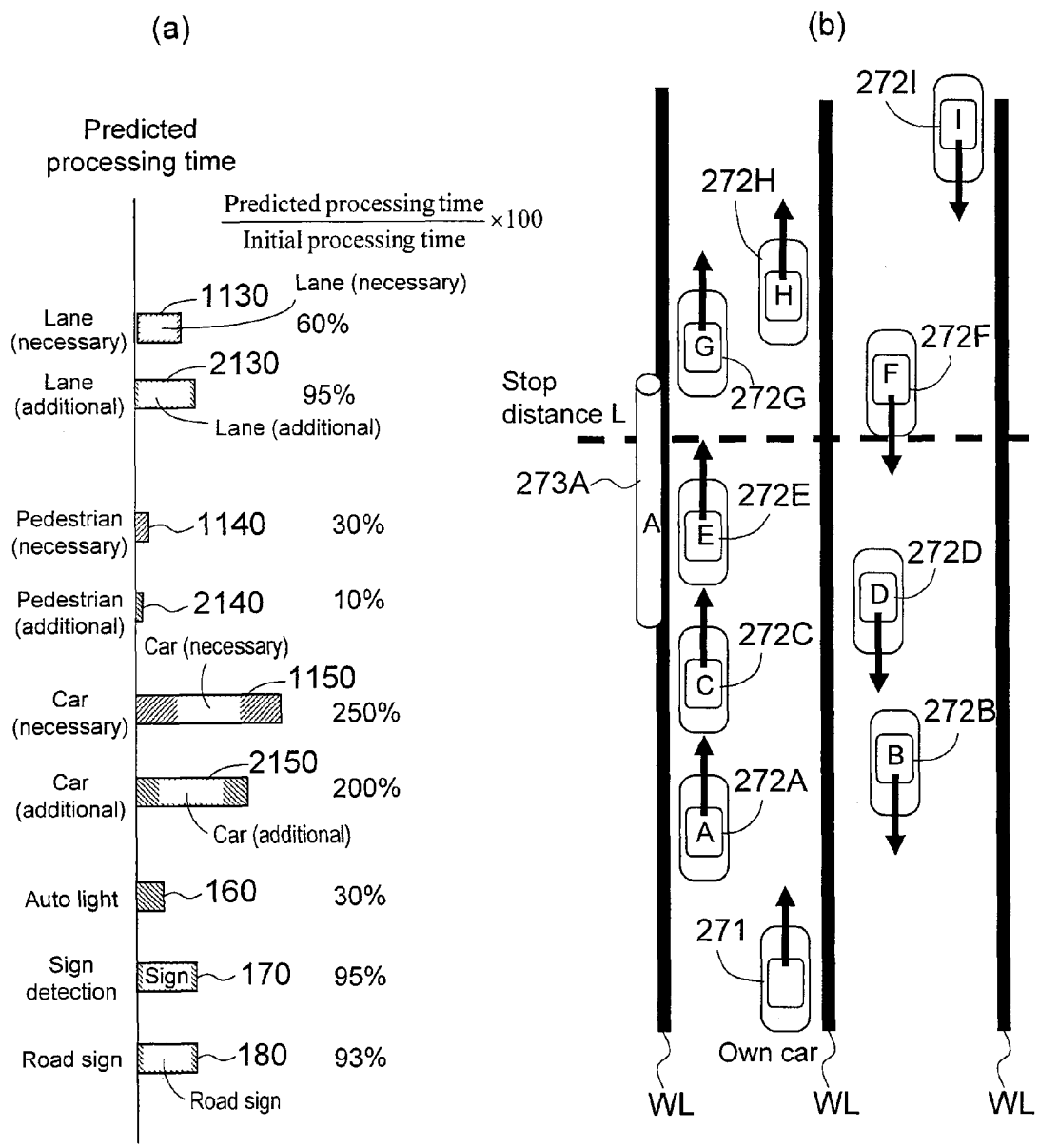
FIG. 27 is a diagram illustrating a method of calculating predicted processing time.

FIG. 27 (*a*) shows a predicted result of the processing time in the scene as shown in FIG. 27 (*b*). The processing time is predicted in consideration also of the processing speed of the CPU. However, the case of the multi-core is analogous to the prediction process in the case of one CPU (one core).

The processing times of the necessary application 1130 and the additional application 2130 of the lane recognition application 130 are predicted on the basis of the previous recognition result from the multi-application execution unit 131, the size of the processing region and the travel environment information 114. The predicted result of the processing time is shown in percentages in comparison with the initial processing time in FIG. 27 (*a*).

The processing time of the pedestrian detection is predicted as with the case of one CPU. In the scene in FIG. 27 (*b*), a candidate captured as a pedestrian candidate by the radar 261 is only a utility pole 273A. Accordingly, this region is cut out, subjected to image normalization for determination of whether it is the pedestrian or not by the image processing, the amount of calculation of pattern matching is estimated, and the processing time is predicted.

Likewise, in the case of the car detection, detection is made by the laser 261, and the processing time is estimated (the processing time is predicted). In the scene in FIG. 27 (*b*), since many cars 272A to 272I exist around the own car 271, the processing load is significantly high. The processing time ratios of the necessary application 1150 and the additional application 2150 of the car detection application 150 are 250% and 200%, respectively.

The auto light application 160 detects a brightness outside the car, and executes determination for turning on and off the lights. Since it is daytime, the process for an oncoming car does not operate, the predicted processing time is short, and the processing time ratio is 30% of that of the initial processing time. Further, the sign detection application 170 and the road sign detection application 180 predicts the processing time from the previous recognition result of application execution information 151 and the car control information 116, and the processing time ratio of the sign detection application is 95% and the processing time ratio of the road sign detection application is 93%.

Figure 22:
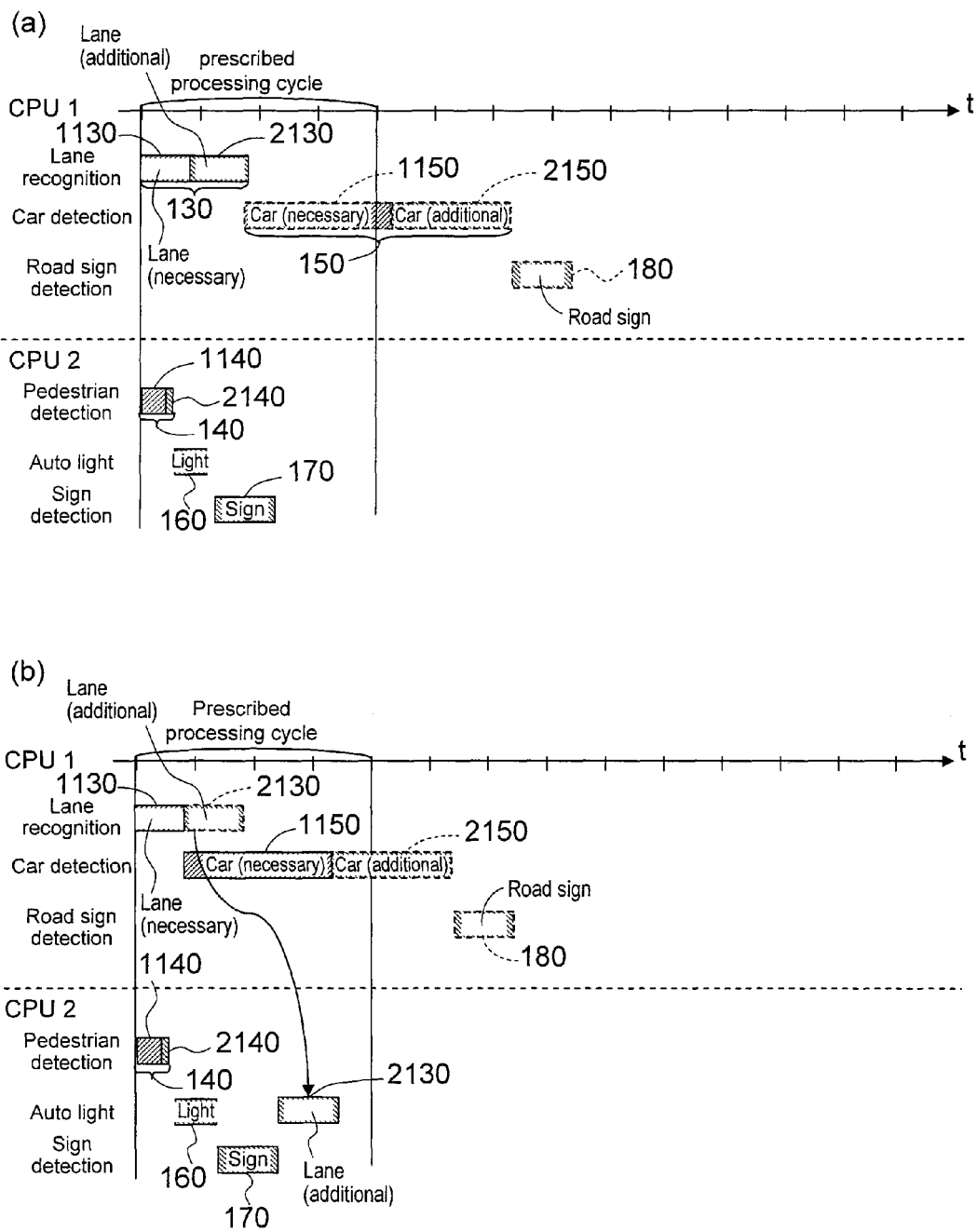
FIG. 22 is a diagram illustrating an example of scheduling in the multi-cores.

If the dynamically predicted processing time can be used, for instance as shown in FIG. 22 (*a*) it can be predicted that the necessary application 1150 of the car detection application 150 is not completed in the core 1 (CPU 1) in the prescribed processing cycle from preliminarily predicted processing time and also be predicted that the additional application 2150 of the car detection application 150 and the road sign detection application 180 which are scheduled in the core 1 thereafter cannot be processed.

Further, it can be predicted that the core 2 (CPU 2) has a surplus available time of the processing time. Accordingly, the function of allocation to core 1 (CPU 1) and core 2 (CPU 2) can be adjusted using the result of dynamic prediction of the processing time.

This equal allocation of the processing load using the prediction of the dynamic processing time allows scheduling sufficiently utilizing the performance of the multi-core (CPU), exerting advantageous effects on completion of the process in the prescribed cycle and effective operation of the convenience functions.

For instance, as shown in change of core (CPU) allocation in two cores (CPUs) (the case of car detection postponement) in FIG. 22 (*b*), the allocation of the additional application 2130 of the lane recognition application 130 is changed from the core 1 (CPU 1) to the core 2 (CPU 2). This allows the operation of the convenience functions to be secured as much as possible while maintaining the real-time feature.

Further, parallel processing using division into small processes having little data interdependency allows alternatives of the method of processing sharing between the cores (CPUs) to be increased. FIG. 22 (*b*) shows a schedule in the case with data-dependent relationship. There are problems in that the parallel processing of car detection cannot be executed owing to consideration of the data dependency, and the car detection (additional) cannot be executed even though the priority order is high.

Figure 23:
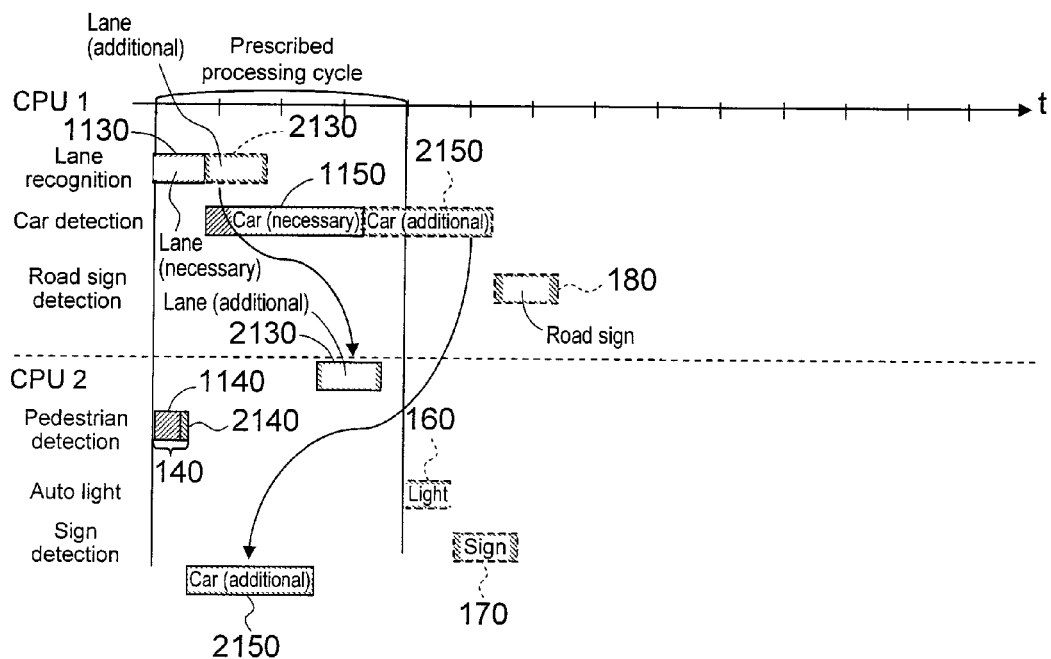
FIG. 23 is a diagram illustrating an example of scheduling in the multi-cores.

For instance, in a schedule in the case of the parallel processing on car detection postponement by two cores (CPUs) in FIG. 23, both the necessary applications and additional applications of the lane recognition application 130, the pedestrian detection application 140 and the car detection application 150 can entirely be scheduled in consideration of a high priority.

The scheduling also in consideration of capability of the parallel processing enables the schedule to be flexibly rearranged according to the processing order and the measures for the termination process, and allows the additional functions pursuing convenience to be effectively executed while persisting in the scheduling method ensuring safety.

<Another Hardware Configuration>

Figure 24:
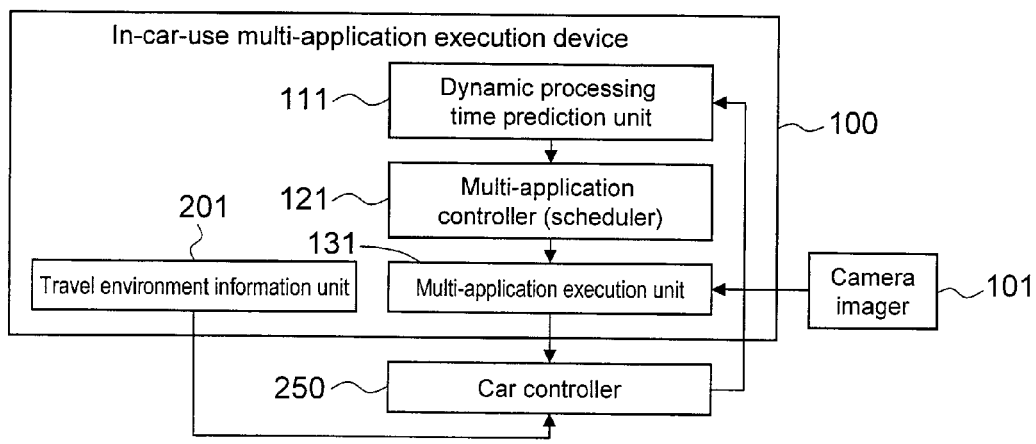
FIG. 24 is a diagram illustrating another embodiment of the in-car-use multi-application execution device.

In the aforementioned embodiment, the description has been made using the example of the configuration in which the in-car-use multi-application execution device 100 is integrally provided in the in-car-use camera. It is not limited to such a configuration. For instance, a structure may be adopted that has a hardware configuration in which a imaging device of a camera as shown in FIG. 24 is separated from the main body of image processing and only the image is transferred.

The in-car-use multi-application execution device 100 may adopt a method of operation partially using the CPU of the main part of the navigation system. This device may use a common CPU for an environment recognition system for protection and safety, or a CPU of the car ECU for managing car control. As shown in FIG. 24, the travel environment information unit 201 may reside inside or outside the main body of the image processing device. It is suffice that the travel environment information is transmitted to the image processing device.

The process of predicting the processing time may be limited to a process largely varying in processing time. Instead, it may be limited to an application on which the processing time can accurately be predicted. In the case of the process largely varying in processing time, the schedule can effectively be changed according to prediction at each time. If each processing time is substantially equivalent or the prediction of the processing time is inaccurate, appropriate scheduling becomes difficult. In such a case, even if the function scheduled according to the fixed processing time that is not dynamically predicted and the dynamic processing time prediction are confusedly used, the advantageous effects thereof can sufficiently be utilized.

In the pedestrian detection and the car detection according to the fusion scheme using the radar 261, determination of the processing region using the result of the radar 261 allows the amount of calculation of the image processing to be highly accurately predicted. In a certain result of the radar 261, the dynamic predicted processing time can become substantially zero if no pedestrian candidate is found. The function largely varying in processing time thus has large advantageous effects of optimization of scheduling due to dynamic prediction of the processing time. In contrast, in the case of the function having a substantially constant processing time, scheduling always with a fixed processing cycle is sometimes superior in cost-effectiveness to addition of a process of predicting the processing time.

The invention claimed is:

1. An in-car-use multi-application execution device, executing a plurality of applications in a prescribed cycle, comprising:
   a dynamic processing time prediction unit dynamically predicting a processing time of each of the applications;
   a multi-application controller scheduling each of the applications on a basis of the processing time dynamically predicted by the dynamic processing time prediction unit; and
   a multi-application execution unit executing processes of the plurality of applications on a basis of a result of the scheduling in the multi-application controller;
   wherein, if the multi-application execution unit determines as a result of the scheduling in the multi-application controller that an application failing to complete a process in a preset prescribed cycle exists, the multi-application execution unit terminates the application or degrades a function of the application on the basis of the preset priority order; and
   wherein the multi-application execution unit classifies the applications according to safety and convenience functions, and executes scheduling such that a process of the application related to safety continues even after an end of the prescribed cycle and a process of the application related to convenience stops on the end of the prescribed cycle.

2. The in-car-use multi-application execution device according to claim 1, wherein the multi-application execution unit divides a process of said processes into pieces for respective target candidates to be processed by the application and executes the pieces.

3. The in-car-use multi-application execution device according to claim 1, further comprising a multi-core or a multi-CPU, wherein, if the multi-application execution unit determines as the result of the scheduling in the multi-application controller that an application failing to complete a process of said processes in the prescribed cycle exists, the multi-application execution unit changes a core or a CPU, which are designated in order to operate the application, to another core or CPU.

4. The in-car-use multi-application execution device according to claim 1, further comprising a multi-core or a multi-CPU, wherein, if the multi-application execution unit determines as the result of the scheduling in the multi-application controller that the application failing to complete a process of said processes in the preset prescribed cycle exists or if the multi-application execution unit intends to complete processes of the respective applications before the prescribed cycle, the multi-application execution unit causes the multi-core or the multi-CPU to execute parallel processing on the same application.

5. The in-car-use multi-application execution device according to claim 1, further comprising a multi-core or a multi-CPU,
   wherein, the multi-application execution unit divides a task of the application according to recognition targets having little data interdependency, and causes the multi-core or the multi-CPU to execute parallel processing.

6. The in-car-use multi-application execution device according to claim 1, wherein, if an available time of a prescribed or higher value continuously exists in the prescribed cycle as a result of the scheduling, the multi-application controller reduces the processing time in the prescribed cycle.

7. The in-car-use multi-application execution device according to claim 1, wherein, if an available time of a prescribed or higher value continuously exists in the prescribed cycle as a result of the scheduling, the multi-application controller executes scheduling of adding the application with a convenience function of said convenience functions into the prescribed cycle.

8. The in-car-use multi-application execution device according to claim 1, wherein the dynamic processing time prediction unit dynamically predicts the processing time on a basis of at least one of information on a preset task table, a state of execution of the application, a car control state, and travel environment information.

9. The in-car-use multi-application execution device according to claim 1, wherein, in a case where the application executes a process of narrowing down an image processing region on the basis of the detection result of a radar and recognizing a recognition target,
   the dynamic processing time prediction unit dynamically predicts the processing time using detection result by the radar.

10. The in-car-use multi-application execution device according to claim 1, wherein, the dynamic processing time prediction unit dynamically predicts the processing time using map information stored in a navigation system or a history of an actual processing time for previous traveling of an own car.

11. The in-car-use multi-application execution device according to claim 1, further comprising own car travel information acquisition unit acquiring travel information of an own car,
    wherein the multi-application execution unit sets a processing mode of the application on a basis of the own car travel information acquired by the own car travel information acquisition unit, and
    the dynamic processing time prediction unit predicts the predicted processing time on the basis of the processing mode set by the multi-application execution unit.

* * * * *